US012783485B2

(12) United States Patent
Atlow et al.

(10) Patent No.: US 12,783,485 B2
(45) Date of Patent: Nov. 3, 2026

(54) SYSTEM AND METHOD FOR FAST QUERIES OF A BACKUP OF A DOCUMENT BASED NON-RELATIONAL DATABASE

(71) Applicant: EON IO Ltd., Tel Aviv (IL)

(72) Inventors: Moshe Atlow, Tsur Hadassa (IL); Benjamin Gruenbaum, Herzliya (IL); Ron Kimchi, Tel Aviv (IL); Assaf Natanzon, Tel Aviv (IL); Roy Caldararu, Tel Aviv (IL)

(73) Assignee: Eon IO, LTD., Tel Aviv (IL)

( * ) Notice: Subject to any disclaimer, the term of this patent is extended or adjusted under 35 U.S.C. 154(b) by 0 days.

(21) Appl. No.: 19/075,087

(22) Filed: Mar. 10, 2025

(65) Prior Publication Data

US 2026/0267839 A1 Sep. 10, 2026

(51) Int. Cl.
*G06F 16/22* (2019.01)

(52) U.S. Cl.
CPC .................................. *G06F 16/221* (2019.01)

(58) Field of Classification Search
None
See application file for complete search history.

(56) References Cited

U.S. PATENT DOCUMENTS 12,436,845 B1 * 10/2025 Gruenbaum ........ G06F 11/1458
2011/0289479 A1 11/2011 Pletter et al.
2016/0019224 A1 1/2016 Ahn et al.
2016/0335302 A1 11/2016 Teodorescu et al.
2017/0123889 A1 5/2017 Haridas et al.
2017/0123890 A1 5/2017 Haridas et al.
2018/0039534 A1 2/2018 Cai et al.
2019/0095272 A1 3/2019 Haridas et al.
2021/0133168 A1 5/2021 Nara
2021/0271686 A1 9/2021 Abdul Rasheed et al.
2021/0342316 A1 * 11/2021 McPherson ......... G06F 16/2282
2022/0043712 A1 2/2022 Rana et al.
2022/0222269 A1 7/2022 Cox
2023/0394017 A1 * 12/2023 Terlecki ................ G06F 16/221
2024/0273112 A1 * 8/2024 Kumar .................. G06F 16/258
2025/0245199 A1 7/2025 Dhulipala et al.

OTHER PUBLICATIONS

Amazon, "Amazon Athena User Guide," 2025; 1695 pages.
Amazon, "Amazon What is AWS Glue?," 2025; 4 pages; accessed via web at https://docs.aws.amazon.com/glue/latest/dg/what-is-glue.html.
Levy, Eran, "What is the Parquet File Format? Use Cases & Benefits," Upsolver; Apr. 20, 2023; 5 pages; accessed via web at https://www.upsolver.com/blog/apache-parquet-why-use.

(Continued)

*Primary Examiner* — Scott A. Waldron
(74) *Attorney, Agent, or Firm* — M&B IP Analysts, LLC

(57) ABSTRACT

In one embodiment, a method comprises analyzing a non-relational database comprising a plurality of documents; and generating a backup of the non-relational database, the backup comprising a table with a plurality of rows and columns, wherein a row of the table corresponds to a document of the plurality of documents, wherein the non-relational database is restorable based at least in part on the table.

20 Claims, 19 Drawing Sheets

(56) References Cited

OTHER PUBLICATIONS

Parquet, "File Format Documentation about the Parquet File Format.," 2025; 1 page; accessed via web at https://parquet.apache.org/docs/file-format/.
Parquet, "Overview All about Parquet," 2025; 2 pages; accessed via web at https://parquet.apache.org/docs/overview/.
Siddiqui, Laiba, "Apache Parquet Explained: A Guide for Data Professionals," datacamp; Feb. 10, 2025; 10 pages; accessed via web at https://www.datacamp.com/tutorial/apache-parquet.
"What is a Document Database?," MongoDB; 2025; 5 pages; accessed via web at https://www.mongodb.com/resources/basics/databases/document-databases.
Amazon, "Amazon EBS fast snapshot restore," 2025; 2 pages; accessed via web at https://docs.aws.amazon.com/ebs/latest/userguide/ebs-fast-snapshot-restore.html.
Amazon, "Amazon EBS snapshots," 2025; 1 page; accessed via web at https://docs.aws.amazon.com/ebs/latest/userguide/ebs-snapshots.html.
Amazon, "How Amazon EBS Snapshots Work," 2025; 3 pages; accessed via web at https://docs.aws.amazon.com/ebs/latest/userguide/how_snapshots_work.html.
Rubrik, "Exploring the Depth of Simplicity: Protecting Microsoft SQL Server with Rubrik," Technical White Paper; Mar. 2017; 15 pages.
Rubrik, "Protecting Microsoft SQL Server with Rubrik," Rubrik Technical Marketing; Technical White Paper; Sep. 2023; 31 pages.

* cited by examiner

SYSTEM AND METHOD FOR FAST QUERIES OF A BACKUP OF A DOCUMENT BASED NON-RELATIONAL DATABASE

TECHNICAL FIELD

This disclosure relates in general to the field of mobile applications and, more particularly, to a system and method for fast queries of a backup of a document based non-relational database.

BACKGROUND

Cloud database backup is the process of creating and storing copies of a database in a remote, cloud-based environment to ensure data availability, protection, and recovery in case of failure or data loss. While organizations may utilize traditional on-premises backups, cloud backups offer greater flexibility and scalability, allowing businesses to adjust storage as needed and access their data from anywhere with an internet connection. Cloud backups typically provide automated processes, encryption, and redundancy across multiple servers, enhancing both security and reliability. This ensures that businesses can recover their databases quickly, minimizing downtime and mitigating the risk of data breaches or corruption.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Figure 1:
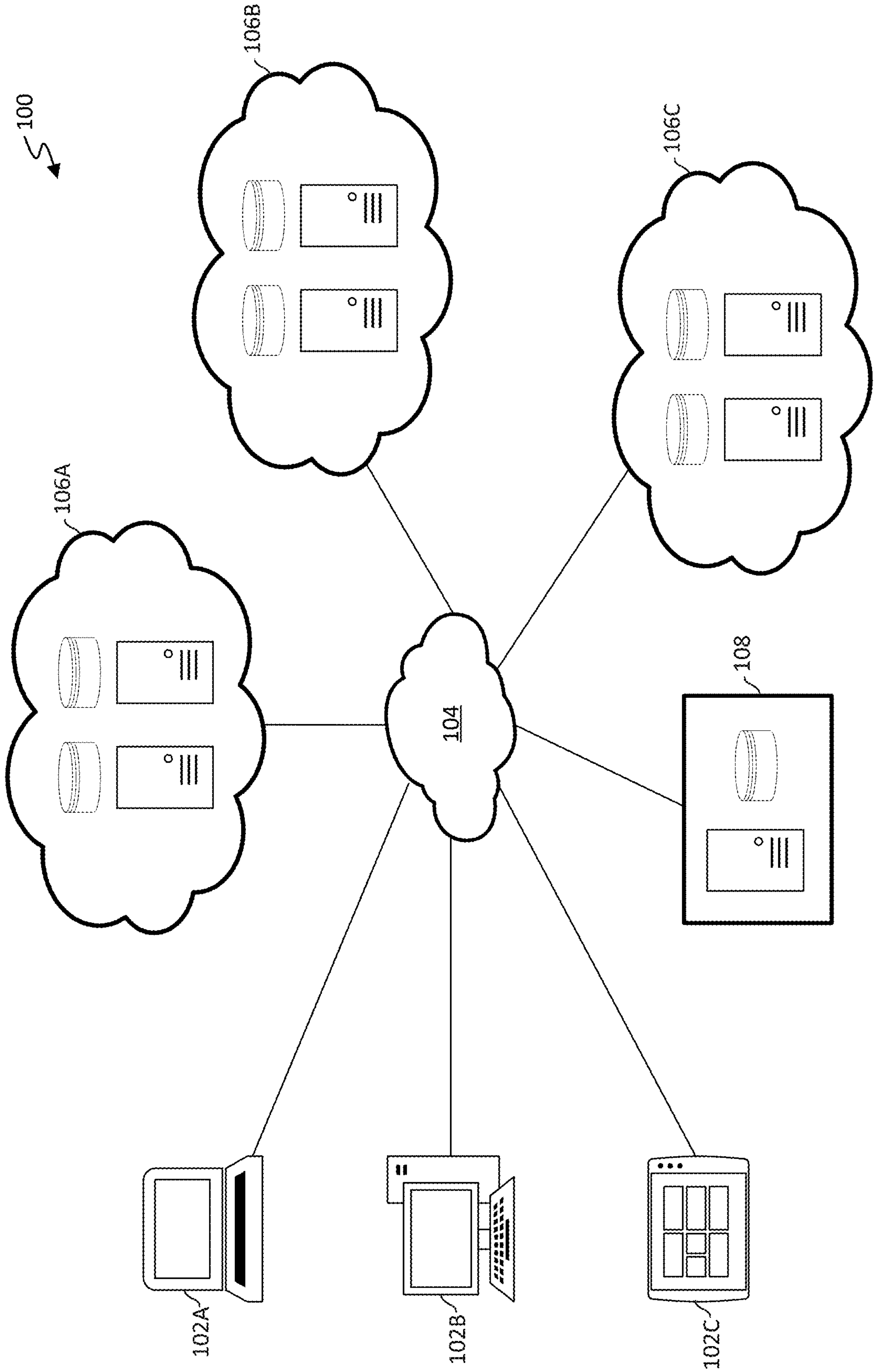
FIG. 1 illustrates a block diagram of a cloud database backup environment, in accordance with any of the embodiments disclosed herein.

FIG. 1 illustrates a block diagram of a cloud database backup environment 100, in accordance with any of the embodiments disclosed herein. An organization (e.g., any one or more users associated with each other) may be associated with any number of databases that are accessed by users associated with the organization. As used herein, "database" may refer to one or more of a database that is not backed up, a database that is backed up, a backup of a database, or a backup of multiple versions of a database. The users may interact with the databases using computing devices 102 (e.g., 102A, 102B, 102C).

The databases may be stored (temporarily or persistently) at a site owned or leased by the organization (e.g., "on premises"), at another location (e.g., owned or managed by a cloud service provider), or at multiple locations. The databases of an organization may be backed up in the cloud, e.g., within a backend 106 (e.g., 106A, 106B, 106C) of a cloud backup service provider, across multiple backends of the same cloud backup service provider, at one or more backends of a different cloud backup service provider, at another suitable location (e.g., at a local site of the organization), or any combination thereof (e.g., some databases may be backed up at backend 106A, other databases may be backed up at backend 106B, and some databases may be backed up at a local site). In some instances, the organization may also have databases that are not backed up (but rather stored locally, in the cloud, or otherwise).

An organization may include any number of users that utilize computing devices 102 to perform operations with respect to databases associated with the organization. The interaction between a user and a database may be indirect and facilitated by a frontend interface, such as a web browser, a desktop application, a mobile application, or other interface. The interface may translate requests of the user into a format (e.g., a database query language, such as Structured Query Language (SQL)), C++, Python, Java, etc. that is compatible with a database management system (DBMS) which processes the requests and returns requested data and/or confirmation of completion of requests. The interface may then present the requested data or confirmation in a format that is user friendly. In some instances, a user may interface with a database in a more direct manner, e.g., through a database client tool that allows the user to write and execute database queries directly.

Large organizations tend to have significant amounts of databases. For example, a large enterprise may have hundreds, thousands, or even tens of thousands of databases (or at least tens of thousands of database tables within hundreds or thousands of different databases). In such environments, finding the correct database (or more particularly the correct table of a database) in order to restore data (e.g., a full database, a specific table, etc.), initiate a backup, or query data may be very tedious. Even with robust search functionality, finding a database may be difficult without viewing the actual contents of the database. However, mounting and configuring a database in order to access its contents may be a time consuming endeavor (e.g., on the order of minutes per database), even in modern backup solutions. The process may take even longer if the wrong database or wrong database version is selected.

In various embodiments of the present disclosure, systems and methods for enhanced searching, previewing, and querying of databases are provided. In various embodiments, the enhanced searching may allow for searching of various metadata items of the databases (e.g., table names, table schema information, indexed columns, columns with personally identifiable information (PII)), or other metadata) as well as various changes to the metadata items of the databases (e.g., changes to table schemas, deleted table names, changes to indexed columns, etc.). In various embodiments, a database may be quickly previewed (e.g., without having to mount and/or configure the database responsive to a user's request to view data from the database). For example, small portions of the tables (e.g., a limited number of rows) of a database may be stored (e.g., separately from the database itself) and may be accessed quickly and provided to a user upon a request to preview the table (e.g., after an enhanced search or at other suitable time). In various instances, the rows of the preview may be the most recently modified rows in the table (e.g., the preview may include rows that have been updated between a previous version of a backup of the database and the most recent version of the backup). The previews may significantly aid a user in determining whether the table is the table that the user was looking for and/or may help a user quickly ascertain the nature of a table (e.g., when deciding whether a database is to be backed up).

Typically, backup vendors keep a database backup in a format similar to the production format of the database. In some instances, a binary copy of the database data may be kept by backing up the storage (e.g., block level storage) of a machine (e.g., virtual machine) on which the database runs (and the backup may be restored and accessed by bringing up the virtual machine and querying the database through the virtual machine). In various instances, the database backup may be in a format set by the backup tool. For example, pg_dump keeps data tables in its own simple format when backing up a PostgreSQL database (e.g., a plain-text file containing SQL commands allowing reconstruction of the database or an archive file format that is used with pg_restore to restore the database).

In various embodiments, at least a portion of the databases of an organization (or various organizations that utilize a backup service) are backed up in a manner that allows the backups themselves to be queried very quickly (e.g., without requiring the database to be restored, mounted, and/or configured to service the query). For example, a database backup may be partitioned such that the records of the tables of the underlying database are stored in separate files that may be accessed in parallel responsive to a database query. In a particular embodiment, when a database is backed up, a table is identified, a column (e.g., primary key) for the table is identified, and the records of the table are grouped based on ranges of values in the records of the table for the primary key. The records for each group are then stored in separate Parquet files, with each Parquet file including records with values of the primary key within a range corresponding to that Parquet file. This process may be repeated for additional tables of the database (with a set of Parquet files being created for each table of the database assuming the respective table is large enough (e.g., over a threshold size) to warrant multiple Parquet files). Metadata for the tables of the database (e.g., the schema, stored procedures, index information, views, etc.) may be stored in one or more files separately from but in association with the Parquet files. For example, the metadata may be stored in the same directory, physical storage device, or backend 106 as the Parquet files of the same table. The partitioned database backups may then be used as the basis for a fast query of the database or (in conjunction with the stored metadata) to restore the database.

In various embodiments, the databases that are backed up may comprise relational (e.g., SQL) databases (e.g., MySQL, PostgresSQL, SQL Server, Oracle Database, SQLite) and/or document based or other non-relational (e.g., NoSQL) databases (e.g., MongoDB, CouchDB, Firebase Firestore, RavenDB, Cassandra, Redis).

In embodiments in which document based non-relational databases are to be backed up, data of the databases may first be translated into a tabular format, such that the data may be queried quickly and/or partitioned as described herein. In some embodiments, the format of the backups of the non-relational databases may be similar to the format of the backups of the relational databases, such that the backups of the non-relational databases and the relational databases may be searched together responsive to the same search query. In various embodiments, when a document based non-relational database is to be backed up, a collection of the database may be analyzed to determine which fields (also referred to as keys) appear frequently in the documents of the collection. Each of these fields is then represented in the backup by a column in a table, with each document of the collection represented in a row in the backup. For any fields of a record that are not selected for representation in a distinct column, the fields and corresponding values may be combined within an additional column in the table. Additional metadata may also be stored in the backup that may be used to restore the database to its original format using the metadata and the table of the backup. In some instances, depending on its size, the table may be split into multiple Parquet files.

Continuing the search example recited above, after a user has searched for and identified a target database, the user may submit SQL queries to the partitioned database backup and view records returned from the partitioned database backup. In some embodiments, the user may also be allowed to write to the partitioned database backup as well through the same user interface used to read records from the partitioned database.

Various embodiments may provide one or more technical advantages such as faster identification of target data, faster and/or more efficient querying of data, decreased usage of computing and/or network resources when searching for and accessing target data, or other technical advantages. For example, when the table data is partitioned into multiple objects (e.g., where an object includes a Parquet file), the objects may be queried in parallel by a SQL database tool of a backend (e.g., Amazon Athena), thus significantly improving the speed of the query. Storing records of the database backups in Parquet files may also improve the portability of the backups (e.g., the Parquet files may be easily moved to a different backend 106 if the organization decides to switch service providers).

In the depicted embodiment, the cloud database backup environment 100 includes a database backup and search system 108. The database backup and search system 108 may provide any suitable features of the database backup, enhanced searching, database previewing, and/or database accessing described herein. In other embodiments, any of these features or a subset thereof may be performed by any other suitable logic, such as computing devices within one of the backends 106, by a computing device 102 (e.g., through a web application or native application that interfaces with the database backup and search system 108), or by other suitable logic. For example, database backup and search system 108 may generate partitioned database backups, a plurality of database metadata records that may be used in providing the enhanced searches, and a plurality of database preview records that may be used to provide database previews. The database backup and search system 108 may receive requests from one or more computing devices 102 to backup databases and in response may generate partitioned database backups. The database backup and search system 108 may also receive enhanced search requests from computing devices 102, identify search results in accordance with search terms of an enhanced search, provide enhanced search results to computing devices 102, receive requests for database previews from computing devices 102, provide database previews, and query the partitioned database backups. The database backup and search system 108 may also be operable to restore databases from their partitioned database backups. Any functionality described herein with respect to a partitioned database backup may also be present for non-partitioned database backups.

Database backup and search system 108 may include any suitable number of computing devices to perform the functions described herein. In a particular embodiment, the database backup and search system 108 may comprise a cluster of nodes (e.g., physical or virtual machines) in a Kubernetes environment, although any suitable computing environment may be used to implement the database backup and search system 108. The database backup and search system 108 may include and/or manage a plurality of accounts, where a particular account may be associated with (e.g., owned or controlled by) a particular organization. Data used to provide enhanced searching functionality, database preview, database backup, or fast partitioned database backup searching for a particular organization may be stored in the account owned by that organization. In various embodiments, the database backup and search system 108 may be separate from the backends 106 or could be implemented (at least in part) within one of the backends 106.

Computing devices 102 may include any electronic computing device operable to receive, transmit, process, and store any appropriate data. In various embodiments, computing devices 102 may be mobile devices or stationary devices. As examples, mobile devices may include laptop computers, tablet computers, smartphones, personal digital assistants, and other devices capable of connecting (e.g., wirelessly) to network 104 while stationary devices may include desktop computers or other devices that are not easily portable. Computing devices 102 may include a set of programs such as operating systems (e.g., Microsoft Windows, Linux, Android, Mac OSX, Apple iOS, UNIX, or other operating system), applications, and other software-based programs capable of being run, executed, or otherwise used by the respective devices. A computing device may include at least one graphical display and user interface allowing a user to view and interact with applications and other programs of the computing device to perform operations associated with one or more databases (e.g., searching for databases, modifying database contents, reading database contents, initiating database backups, etc.).

FIG. 1 also depicts a network 104 that couples the computing devices 102, backends 106, and database backup and search system 108 together. The network 104 may transport communications between computing devices 102, the various backends 106, and the database backup and search system 108.

Figure 2:
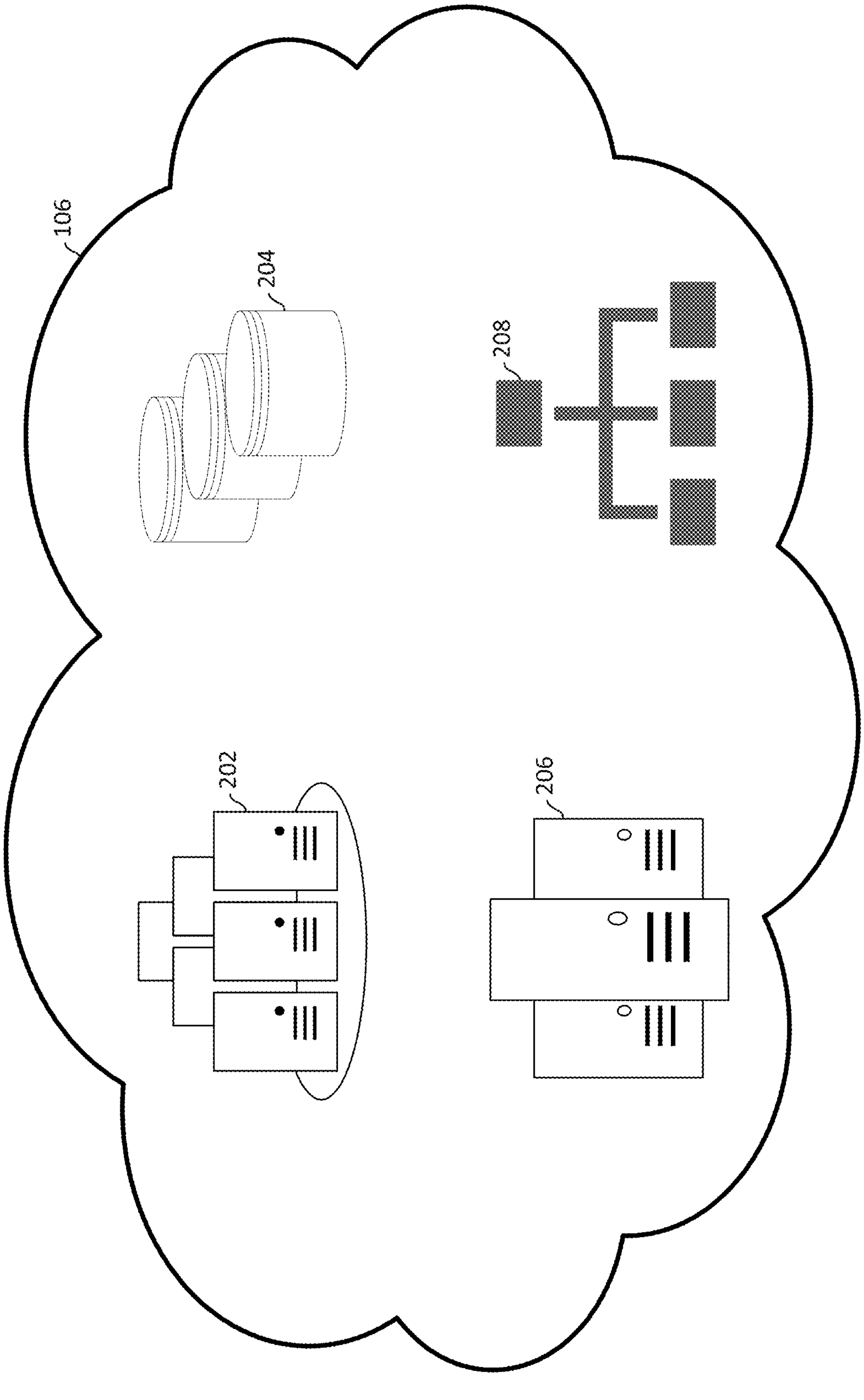
FIG. 2 illustrates a block diagram of a backend of a cloud backup service provider of the environment of FIG. 1, in accordance with any of the embodiments disclosed herein.

FIG. 2 illustrates a block diagram of a backend 106 of a cloud backup service provider of the environment of FIG. 1, in accordance with any of the embodiments disclosed herein. Backend 106 may include various computing systems to provide services (including database backup services) to various organizations. In the embodiment depicted, backend 106 includes compute resources 202, storage resources 204, operations computing systems 206, and networking resources 208.

Compute resources 202 may include hardware components used to provide cloud services, such as general-purpose processors (e.g., central processing units (CPUs), server processors, accelerated processing units (APUs), controllers), specialized processors (e.g., graphics processing units (GPUs), application-specific integrated circuits (ASICs), digital signal processors (DSPs), field programmable gate arrays (FPGAs), neural network processing units (NPUs), data processor units (DPUs), controller cryptoprocessors (specialized processors for cryptographic algorithms)), or accelerators (e.g., graphics accelerators, compression accelerators, artificial intelligence accelerators), or other hardware components.

Storage resources 204 may provide the storage and retrieval of data (e.g., databases (including backups) or associated data). Storage resources 204 may include hardware, such as hard disk drives, solid-state drives, tape storage, or other suitable mechanisms for storing data. Storage resources 204 may store any suitable data in any suitable format(s). For example, storage resources 204 may provide object, block, or file storage. In various embodiments, storage resources 204 may include one or more database management systems (DBMS), such as relational databases (e.g., MySQL, PostgresSQL, SQL Server, Oracle Database, SQLite) and NoSQL data bases (e.g., MongoDB, Cassandra, Redis).

Operations computing systems 206 may include any suitable computing systems to manage the various operations of the backend, such as coordination of incoming and outgoing communications; allocation of compute, storage, and networking resources; monitoring of usage; application deployment; enforcement of security (e.g., identity and access management (IAM), encryption and key management, intrusion detection), and other management tasks.

Networking resources 208 may include any suitable hardware or software to facilitate communication among compute resources 202, storage resources 204, and/or other cloud resources of the backend. Networking resources 208 may include, e.g., routers, switches, firewalls, load balancers, gateways, edge devices, network interface cards, and other suitable networking hardware.

The compute resources 202, storage resources 204, and networking resources 208 may be used to provide compute services to clients of the service provider, such as virtual machines, containers, bare metal servers, or serverless computing.

In various embodiments, a backend 106 is managed by a third party. For example, a backend 106 may be deployed using a cloud service such as Amazon Web Services, Microsoft Azure, or Google Cloud Platform. A backend 106 may provide services to organizations using any suitable service model, such as infrastructure as a service (IaaS), platform as a service (PaaS), or software as a service (Saas), or combinations thereof.

In IaaS, on-demand access is provided to essential information technology (IT) infrastructure, such as servers, storage, and networking, over a virtual interface. Users do not need to manage or maintain physical infrastructure, as it is hosted and managed by the cloud service provider. While the provider handles the underlying hardware and maintenance, users retain control over operating systems, storage, and applications they deploy. This eliminates the need for organizations to manage on-premises infrastructure, offering flexibility and scalability.

In PaaS, a development and deployment environment is provided, including the necessary infrastructure and software tools, for creating and managing applications. Users can develop and run cloud-based applications without managing the underlying infrastructure, such as servers, networks, and storage. PaaS is typically accessed on a pay-as-you-go basis and allows users to focus on application deployment and management, while the cloud provider handles the infrastructure and software maintenance.

In SaaS, users access cloud-based applications provided and maintained by a service provider. Instead of installing software locally, users access the applications via the web or application programming interface (API) on a subscription basis. In this model, the service provider oversees the hardware, software, middleware, and security, eliminating the need for end users to manage or update the software themselves.

An organization may utilize one or more backends 106 to provide database backup for the organization. Database backup is the process of creating a copy of the data of a database that can be used to restore the database in case of data loss, corruption, or other disasters. Backups are essential for data protection, disaster recovery, and ensuring business continuity.

Various types of backups may be performed on the databases of an organization. In a full backup, a complete copy of the entire database is saved in the backup storage. This is the most comprehensive type of backup but can be time consuming and storage intensive. In an incremental backup, only the data that has changed since the last backup (either full or incremental) is saved in the backup storage. This reduces the amount of data to be backed up and speeds up the backup process. In a differential backup, all of the data that has changed since the last full backup is saved in the backup storage. This is faster than a full backup but can grow in size over time until the next full backup. In a transaction log backup, all of the transactions that have occurred since the last transaction log backup are saved in the backup storage. This is often used with full and differential backups to provide point-in-time recovery. This type of backup may utilize less space than other backup options but may require a long time to restore data from the backup storage.

An organization may utilize various backup strategies (and could utilize different backup strategies for different databases). For example, in a full backup strategy, full backups are regularly performed. This strategy may be suitable for small databases where backup time and storage size are not significant concerns. In an incremental backup strategy, a full backup may be performed periodically (e.g., weekly) and incremental backups are performed more often (e.g., daily). This reduces backup time and storage requirements. In a differential backup strategy, a full backup is performed periodically (e.g., weekly) and differential backups are performed more often (e.g., daily). This strategy provides a balance between backup time and storage. In a mixed strategy, various types of strategies (e.g., full, incremental, and transaction log backups) may be combined to optimize backup and recovery times.

An organization may utilize any suitable database backup product to implement their desired backup strategies and to create database backups that are stored on a backend 106 or other location. Various such commercially available products include, e.g., Oracle RMAN (Recovery Manager), Microsoft SQL Server Backup, MySQL Enterprise Backup, pg_dump, pg_basebackup, IBM Db2 Backup, Veritas NetBackup, Veeam Backup & Replication, and Commvault.

Figure 3:
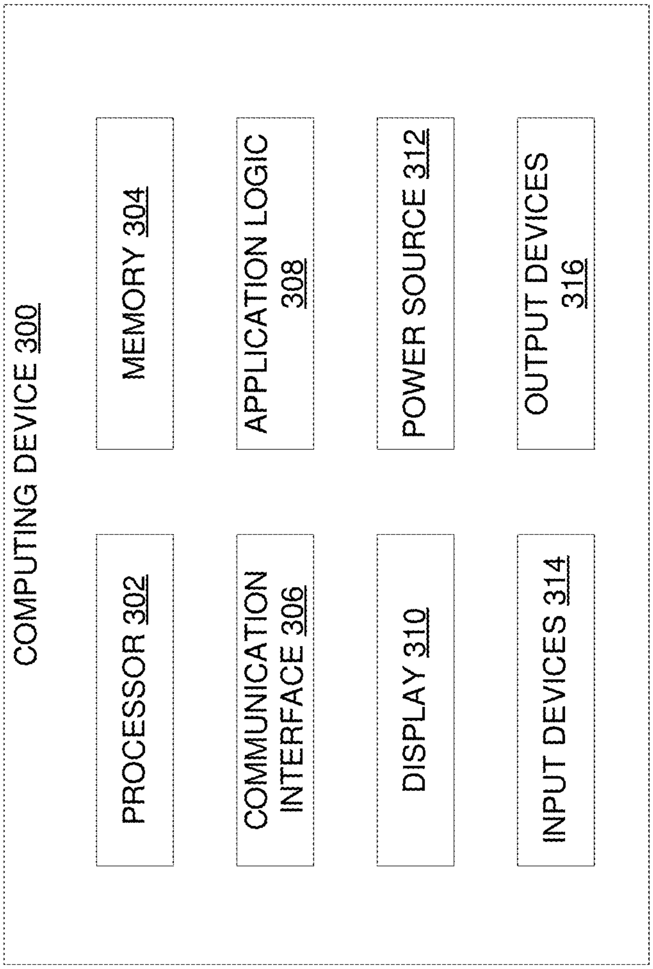
FIG. 3 illustrates a block diagram of a computing device of FIG. 1, in accordance with any of the embodiments disclosed herein.

FIG. 3 illustrates a block diagram of a computing device 300, in accordance with any of the embodiments disclosed herein. One or more computing devices 300 (or portions or alternatives thereof) may be used to implement a computing device 102, one or more portions of database backup and search system 108, or one or more portions of backends 106. As used in this document, the term computing device is intended to encompass any suitable processing device. A computing device 300 may be operable to receive, transmit, process, store, or manage data and information associated with cloud database backup environment 100.

In the depicted embodiment, computing device 300 includes one or more processors 302, memories 304, communication interfaces 306, application logic 308, display 310, power source 312, input devices 314, and output devices 316, among other hardware and software. These components may work together in order to provide any suitable functionality described herein.

A processor 302 may be any suitable computing device, resource, or combination of hardware, stored software and/or encoded logic operable to provide, either alone or in conjunction with other components of computing device 300, the functionality of the computing device. In particular embodiments, computing device 300 may utilize multiple processors to perform the functions described herein. In various embodiments, processor 302 may include one or more general-purpose processors (e.g., CPUS, server processors, APUs, controllers), specialized processors (e.g., GPUs, general-purpose GPUs, ASICs, DSPs, FPGAs, NPUs, DPUs, controller cryptoprocessors (specialized processors for cryptographic algorithms)), or accelerators (e.g., graphics accelerators, compression accelerators, artificial intelligence accelerators).

A processor can execute any type of instructions to achieve the operations detailed in this specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 304 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 304 may store any suitable data or information utilized by a computing device 300, including software embedded in a (e.g., non-transitory) computer readable medium, and/or encoded logic incorporated in hardware or otherwise stored (e.g., firmware). Memory 304 may also store the results and/or intermediate results of the various calculations and determinations performed by processor 302.

Communication interface 306 may be used for the communication of signaling and/or data between computing devices and one or more networks and/or network nodes coupled to a network or other communication channel. For example, communication interface 306 may be used to send and receive network traffic such as data packets. Each communication interface 306 may send and receive data and/or signals according to a distinct standard such as an LTE, IEEE 802.11, IEEE 802.3, or other suitable standard. In some instances, communication interface 306 may include antennae and other hardware for transmitting and receiving radio signals to and from other devices in connection with a wireless communication session over one or more networks.

Application logic 308 may include logic providing, at least in part, the functionality of the computing device. In a particular embodiment, the logic of a computing device 300 may include software (e.g., a web browser, an application, an operating system, etc.) that is executed by processor 302. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

Display 310 may include one or more embedded or connected (e.g., via a wired or wireless connection) external visual indicators, such as a computer monitor, a touchscreen display, a liquid crystal display (LCD), a light-emitting diode display, or a flat panel display.

Power source 312 may include one or more energy storage devices (e.g., batteries or capacitors) and/or circuitry for coupling components of the computing device 300 to an energy source separate from the computing device 300 (e.g., alternating current line power).

An input device 314 may accept input from a source external to the computing device 300. Examples of input devices 314 may include an image capture device, keyboard, cursor control device, touchscreen, and an audio device (e.g., microphone), to name a few.

An output device 316 may output signals based on information provided by computing device 300. Examples of output devices 316 include an audio device (e.g., a speaker), an audio codec, a video codec, a printer, a transmitter for providing information to other devices, a storage device, to name a few.

Figure 4:
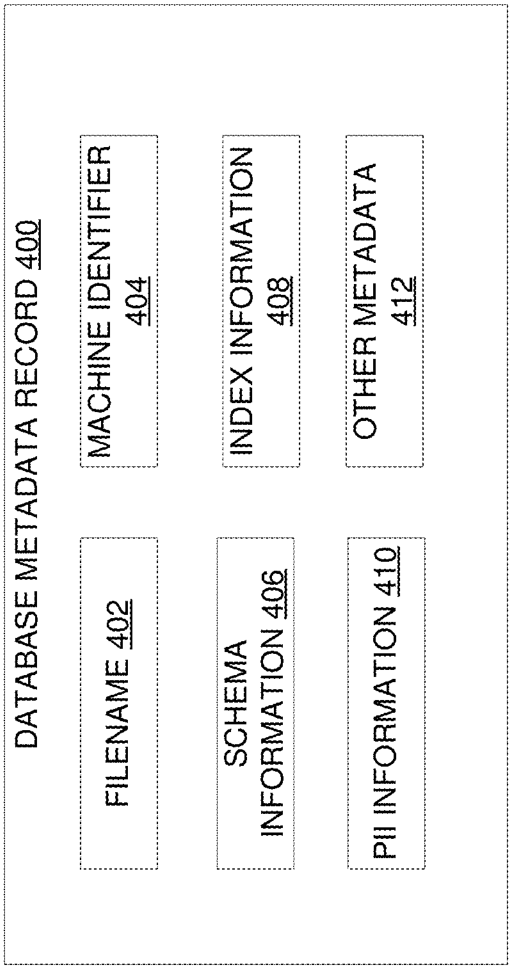
FIG. 4 illustrates an example database metadata record, in accordance with any of the embodiments disclosed herein.

FIG. 4 illustrates an example database metadata record 400, in accordance with any of the embodiments disclosed herein. As alluded to above, enhanced database searching may allow for easier identification of databases and database resources (e.g., tables, columns, or other database portions) based on various types of metadata.

In various embodiments, database metadata records 400 are generated for all or a portion of the databases of an organization (e.g., backed up databases, databases that aren't backed up, databases with multiple versions, etc.) and the database metadata records 400 are stored in a central location (e.g., in the same database file, as associated objects, etc.). In some embodiments, the database metadata records 400 are stored within database backup and search system 108, a backend 106, or other suitable location.

In the embodiment depicted, database metadata record 400 includes file name 402, machine identifier 404, schema information 406, index information 408, PII information 410, and other metadata 412. In other embodiments, any one or more of these metadata items may be omitted.

File name 402 may include, e.g., an alphanumeric string that identifies a name of a database. The filename may also include an extension based on the type of database file (e.g., . db, .sqlite, .mdb, .accdb, .sql, etc.). In some instances, the file name 402 may also include a file path.

Machine identifier 404 may include an identifier of a physical or virtual computing system (e.g., a server) associated with the database. For example, in a physical environment the machine identifier may include an identifier of a physical machine. As another example, in a cloud or virtual environment, the machine identifier may include the name of a virtual machine on which the database is running (e.g., if the database is used in an infrastructure as a service environment) or the name and/or address of a database if the database is run by a managed database service and the infrastructure on which the database runs is unknown. For example, the machine identifier 404 may include a machine name and/or a network address (e.g., an Internet Protocol (IP) address). The computing system may be in a private cloud of the organization, in a backend 106, or other suitable location.

Schema information 406 may specify a structure that defines how data is organized within the database. The schema information 406 may define the logical configuration of various portions of the database (e.g., tables, columns, relationships, keys, indexes, constraints). The schema may define how the data is stored, accessed, and managed. Various examples of schema information 406 are described below. In some examples, the schema information 406 may include any combination of the following.

In an example, the schema information 406 includes names of tables in the database. A table may be a structured collection of related data organized in rows and columns. Each row (also referred to as a record) may represent a single entry in the table (e.g., in a "Students" table, each row might represent an individual student), while each column (also referred to as field or attribute) may represent a specific attribute of the data (e.g., in a "Students" table, columns could include "StudentID", "FirstName", "LastName", "Address", etc.).

In an example, the schema information 406 includes the names of the columns in each table. In another example, the schema information 406 includes the data types of the columns (e.g., integer, varchar, date, Boolean, etc.) that defines the kind of data stored that can be stored in the respective columns.

In another example, the schema information 406 includes one or more relationships between tables. For example, the schema information 406 may include identification of one or more keys, such as a primary key and/or one or more foreign keys. A primary key may be a column (or set of columns) that uniquely identifies each row in a table. The primary key may ensure that no two rows have the same values for the primary key and that these values are not null. Continuing the example above, the "StudentID" column may be the primary key for the "Students" table.

A foreign key is a column (or set of columns) that creates a relationship between two tables by referring to the primary key. A foreign key helps maintain referential integrity, ensuring that data in one table corresponds to valid data in another table. A foreign key in one table may point to the primary key of another table. For example, a foreign key may specify a column in a first table that references a column in a second table, thus constraining the values for the column in the first table to the set of values for the column in the second table. Thus, the foreign key constraint may prevent invalid data from being inserted into the foreign key column since the value inserted has to be one of the values contained in the table with the primary key.

In another example, the schema information 406 includes column constraints. The constraints may include rules that are applied to ensure data integrity. For example, a constraint may require row values for a column to be unique or not null. As another example, a constraint may enforce a condition that must be met for a value to be allowed in a column (e.g., to limit the range or type of data that can be entered).

Database metadata record 400 also includes index information 408. The index information 408 includes indications of which column(s) of the table(s) in the database have been indexed, where the indexing operation enables quicker searching for rows with specific column values. In some embodiments, an index may use a binary tree search with the data in the leaf nodes of the tree (e.g., the index may be stored in a binary tree). In some instances, other data structures may be used to implement an index, such as R-trees, hash indexes, inverted lists, etc.). An index may be a single column index or a composite index (a combination of multiple columns).

Database metadata record 400 also includes PII information 410. PII may include information connected to an individual that can be used to uncover that individual's identity or other sensitive information associated with that individual. Categories of PII may include, e.g., personal details (including information types such as full name, email address, phone number), unique identification numbers (including information types such as driver's license numbers, government-issued ID numbers, social security numbers), biometric data (including information types such as fingerprint, retinal scan data, other biological characteristic), financial information (including information types such as bank account numbers, credit card numbers, debit card numbers), medical records, or other sensitive information.

In one example, the PII information 410 may include indications of which columns include PII information (e.g., a list of the names of the columns that include PII, a binary indication for each column as to whether the column includes PII, etc.). As another example, for columns that include PII, the PII information 410 may additionally or alternatively include an indication of the category and/or type of PII for each column.

Database metadata record 400 may include other metadata 412, which may include any suitable metadata not mentioned above. For example, other metadata 412 may include a summary of column information, e.g., an indication of what type of information is stored in the column (e.g., credit card numbers, emails, locations, etc.) or a value obtained from performing an operation on the values in the column (e.g., an average value). As another example, other metadata 412 may include sizes of tables (e.g., number of rows, number of columns, total content size, or other suitable size information).

The database metadata record 400 may include the most current metadata for the database (e.g., the filename, machine identifier, schema information, index information, PII information, or other metadata for the latest version of the database, which may also be the most recent backup of the database). In various embodiments, the database metadata record 400 may additionally or alternatively include changes that have occurred to the metadata across various versions of the database. For example, the database metadata record 400 may include all of the changes that have occurred from the first version of the database to the most current version of the database or any subset thereof (e.g., the changes that have occurred in the last N versions of the database or over a certain time period).

The database metadata record 400 may include any suitable changes to the metadata. For example, database metadata record 400 may include tables, columns, and indexes that have been added, dropped, or edited (e.g., through a name or other parameter change) across multiple versions of the database. As another example, database metadata record 400 may include other changes to the schema, such as creation, deletion, or changes to primary or foreign keys. As another example, database metadata record 400 may include columns with PII information that have been added, dropped, or edited.

The changes may be stored in the database metadata record 400 in any suitable manner. For example, the database metadata record 400 may include an initial collection of the metadata and a list of the changes specifying when the changes were made and/or in which version of the database the changes were made. As another example, the database metadata record 400 could include a collection of the metadata for each version (or a subset of the versions) of the database that is backed up and the changes may be ascertained by comparing the collections against each other (where a timestamp and/or version number may also be stored for each different version).

The database metadata record 400 may be updated at any suitable time. In some instances, the database metadata record 400 is updated responsive to a backup of a database (e.g., after determining that at least one change to the metadata is present in the backup relative to the previous backup). Additionally or alternatively, a database may be periodically checked to determine whether the corresponding database metadata record 400 is to be updated. For example, the databases of an organization may be periodically scanned and/or accessed to determine whether the database metadata record 400 should be updated.

The collection of database metadata records 400 of an organization may be stored at any suitable location. For example, a database metadata record 400 may be stored with (e.g., in the same physical storage device) as the associated database backup(s). As another example, a database metadata record 400 may be stored in the same backend 106 as the associated database backup(s). As yet another example, a database metadata record 400 may be stored in a separate location from the associated database backup(s) (e.g., database metadata records 400 could be stored in a system of the database backup and search system 108 or in a private cloud of the organization) so as to make searching of the collection of database metadata records 400 faster. As described above, in some embodiments, the database metadata records 400 are aggregated together into the same database file that is accessed when an enhanced search is performed.

Figure 5:
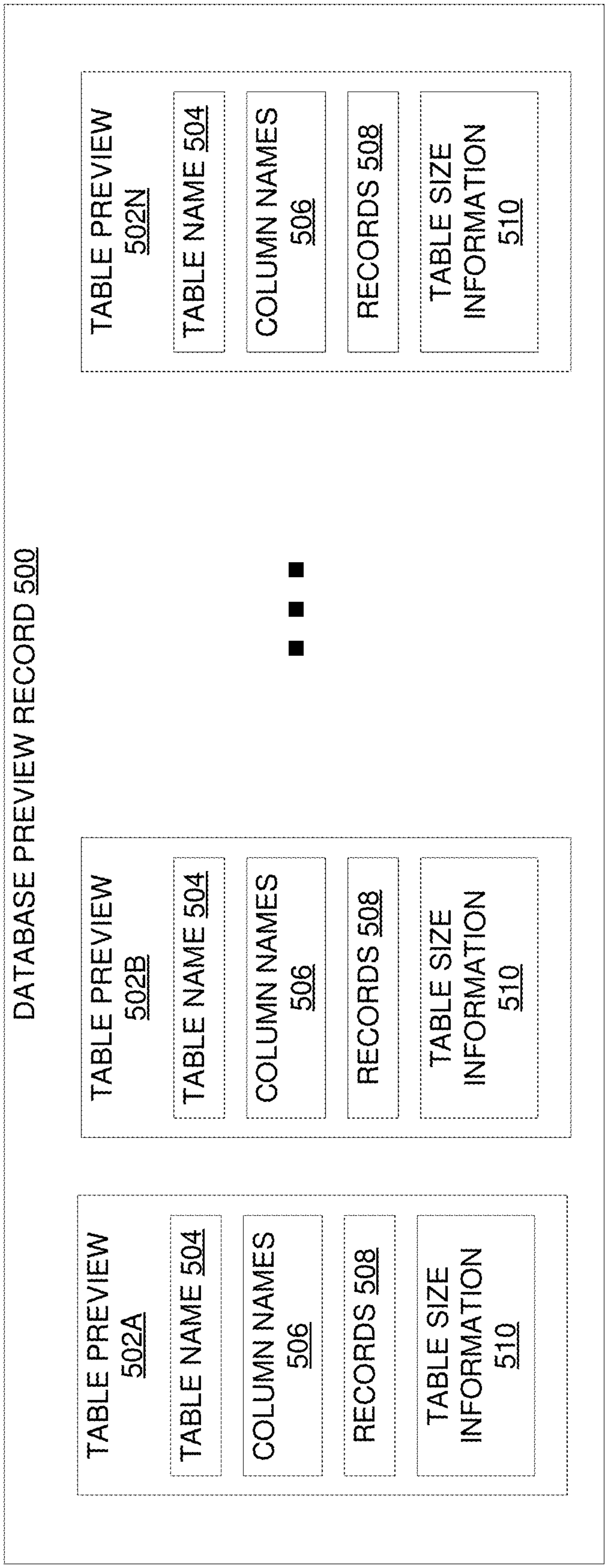
FIG. 5 illustrates a database preview record, in accordance with any of the embodiments disclosed herein.

FIG. 5 illustrates a database preview record 500, in accordance with any of the embodiments disclosed herein. A database preview record 500 may include a variety of information for one or more tables of the database corresponding to the particular database preview record 500. In the embodiment depicted, the database preview record 500 includes a table preview 502 (e.g., 502A, 502B, . . . , 502N) for each table of the database. A table preview 502 includes table name 504, column names 506, records 508, and table size information 510.

Table name 504, column names 506, or table size information 510 may be similar or equivalent to the table name, column names, or table size information that may also be included in schema information 406 or other metadata 412. In some instances, the database preview record 500 may leverage portions (e.g., table name 504, column names 506, or table size information 510) of the database metadata record 400. For example, a single copy of any of these may be stored and utilized in both database metadata record 400 and database preview record 500. As another example, a single instance of any of these may be ascertained from a database (e.g., from a snapshot or the database itself as described below) and then stored in both the database metadata record 400 and the database preview record 500.

Records 508 include values for the columns of the table. A record (also referred to as a row) may include a value for each column (or a null value if applicable). In some instances, a record may include an obfuscated value for a column (or multiple obfuscated values for multiple columns). For example, if a column of a table includes PII (e.g., that should not be visible to the backup administrator and/or other users of the organization), the values of the column are obfuscated. Thus, sensitive PII information (e.g., credit card numbers, social security numbers, etc.) is not included in the table preview 502, but rather some obfuscated version of the data is stored in the table preview 502. The data may be obfuscated in any suitable manner. For example, the data may be encrypted, the data may be replaced with a predetermined value (e.g., all ones, all zeros, all asterisks, etc.), or the data may be replaced with a null value.

In some instances, the level of data obfuscation for the previews may be user configurable (e.g., an administrator or other user of the organization could provide the types of data that are to be obscured to the database backup and search system 108 for use in generating the table previews 502). In one embodiment, even absent user input, the system may enforce a default level of obfuscation (e.g., the system may obfuscate data in accordance with one or more privacy standards, such as the General Data Protection Regulation (GDPR) or Health Insurance Portability and Accountability Act (HIPAA)). The selection of the data to be obfuscated may, in some instances, be based on the type of data stored in the columns (e.g., as recorded in PII information 410 of a corresponding database metadata record 400).

In some embodiments, multiple different levels of obfuscation may be implemented. In one example, multiple versions of the table preview 502 may be kept, with different columns obfuscated in the various versions. The various versions may be provided to users based on privilege levels associated with the users. For example, only users with a particular privilege level are allowed to view a version of the preview 502 in which PII is not obfuscated. As another example, a user with a lowest privilege level may be presented with a version of the preview 502 that has the most columns obfuscated. In some embodiments, one or multiple versions may utilize different cryptographic keys associated with various privilege levels that may be used to decrypt PII that is encrypted within the one or more versions of the table preview 502 to implement different levels of obfuscation.

Unless the corresponding table is very small, the records 508 of the table preview 502 are a subset (e.g., a very small subset) of the records of the table. For example, the number of records 508 in each table may be equal to or less than a fixed number of records (e.g., 25 records, 50 records, 100 records, 200 records, etc.). In some examples, the number of records 508 of a table preview 502 may be limited to the number of records that keeps the data size of the records 508, table preview 502, or database preview record 500 under a threshold data size (e.g., 0.5 MB, 1 MB, 2 MB, 5 MB, etc.). Limiting the size of the previews in this manner may reduce the required storage and allow the previews 502 to be communicated to users relatively quickly (especially compared to mounting and querying the database). In some instances, the number of records included in the previews may be user configurable (e.g., an administrator of the organization could provide the threshold to the database backup and search system 108 for use in generating the table previews 502).

In various embodiments, the table previews 502 of a database preview record 500 may include previews for multiple versions of one or more of the tables of a database. For example, for a first version of a database (e.g., backed up at a first point in time) the database preview record 500 may include table previews 502 for each of the tables of the first version of the database, for a second version of the database (e.g., backed up at a second point in time) the database preview record 500 may include table previews 502 for each of the tables of the second version of the database (which may include the same tables as in the first version of the database or one or more of the tables may be omitted or added from the second version). The database preview record 500 may include any number of table previews for different versions of the tables. Such embodiments may be helpful if a schema for one or more tables has been changed between versions.

In some embodiments, a table preview 502 for a particular table version may include its own copy of metadata and data (e.g., records 508) or may share metadata and data with a table preview 502 for another table version (e.g., to conserve storage space). For example, a table preview 502 for a particular table version could include the table name 504, column names 506, records 508, or table size information 510 or could include one or more references to the table name 504, column names 506, records 508, table size information 510, or portions thereof. In some instances, a table preview 502 of a particular table version may simply include indications of any changes to the metadata or data relative to a table preview 502 of another table version (and thus the preview that is shown to a user may be constructed by accessing the other table preview and editing the preview based on any indicated changes). Other suitable arrangements of storing the various previews is contemplated herein.

In some embodiments, table previews 502 of different versions of the same table may include different samples of data (e.g., records 508) of the table (e.g., including data that has been updated since the previous version of the database). In some embodiments, the data may overlap in whole or in part, e.g., if edits to the table were minimal from version to version.

Figure 6:
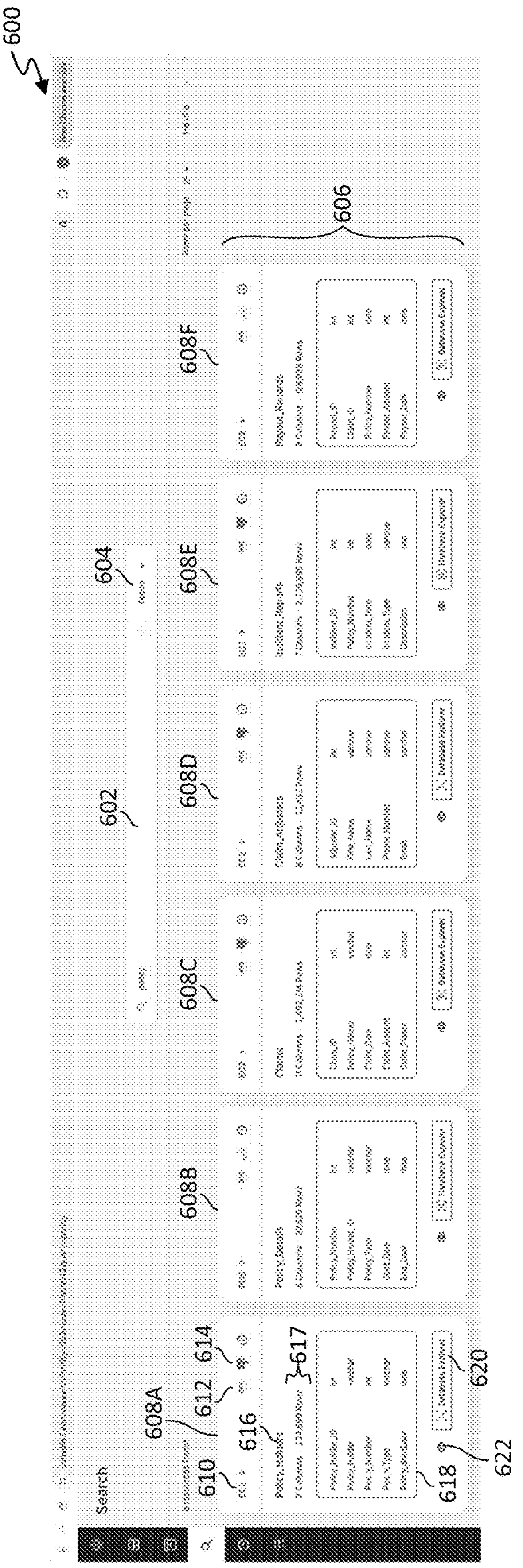
FIG. 6 illustrates an enhanced database search interface, in accordance with any of the embodiments disclosed herein.

FIG. 6 illustrates an enhanced database search interface 600, in accordance with any of the embodiments disclosed herein. In this embodiment, the enhanced database search interface 600 is provided through a web application (e.g., accessed through a web browser executed by a computing device 102), but could also be provided through a native application or by other suitable means.

The enhanced database search interface 600 includes a search bar 602 and a search category selector 604. A search expression is entered into the search bar 602 and a search category is selected via search category selector 604. In one embodiment, the search category selector 604 may allow for a file system search or a database search. In one example, the file system search may perform a search for files in a file system that match the search expression, while the database search (depicted in search category selector 604 as "Tables") may return results in which table names or contents thereof (e.g., column names, data within the table, etc.) of databases match the search expression. In the embodiment depicted, a database search is selected.

The search expression may be any combination of characters, words, operators, and/or symbols. The enhanced database search interface 600 may support any one or more types of searches, such as exact match searches, fuzzy searches (e.g., approximate matching), keyword stemming searches (e.g., the search result includes but is not an exact match with the searched term), synonym searches, semantic searches (a search engine technology that analyzes the meaning of words and phrases to return results that match the intent of a query, rather than just matching words), Boolean searches, wildcard searches, regular expressions searches, natural language searches, or any suitable combinations thereof. In various embodiments, the enhanced database search interface 600 may allow the user to specify the type(s) of search that is to be used. As one example, a user may select between an exact match search and a keyword stemming search. As another example, a user may select between an exact match search and a semantic search.

In the embodiment depicted, a user has entered "policy" into the search bar 602 as the search expression. A search results window 606 displays results 608 (e.g., 608A-F) returned by the search. In the depicted embodiment, the results include representations of tables that include either a table name or a column name that includes the search expression. For example, result 608A represents a table (Policy_Holders) that also includes columns (Policy_Holder_ID, Policy_Holder, Policy_Number, Policy_Type, and Policy_StartDate) that include the search expression "policy"; result 608B similarly includes the search expression in the name of the table and the names of various columns, result 608C includes the search expression in the name of at least one of its columns (Policy_Holder), result 608D may include the search expression in the name of at least one of its columns (e.g., one of the column names that is not shown), result 608E includes the search expression in the name of at least one of its columns (Policy_Number), and result 608F includes the search expression in the name of at least one of its columns (Policy_Number).

A result may include any suitable information about the database resource (e.g., the database itself or portion thereof such as a table, column, or other portion) represented by the result. For example, result 608A displays service type 610, service provider 612, database type 614, table name 616, size information 617, and field preview 618. Other embodiments may include different combinations of this information and/or other information about the resource.

Service type 610 may indicate the service that hosts the resource. In this instance, the service type is Amazon's Elastic Compute Cloud (EC2), indicating that the database that includes the resource is running inside of a virtual machine managed by the organization. As a contrast, in result 608B, the service type is Amazon's Relational Database Service (RDS), indicating that the database that includes the resource is within a managed database service.

Service provider 612 indicates an entity that provides the service that stores the database or database backup (e.g., the provider of the backend, private cloud, or other service). In each of the displayed results, the service provider is Amazon Web Services (AWS). In some embodiments, service provider 612 may include an icon. In some instances, the service provider could be the organization itself or a service associated with the organization (e.g., if the database is stored locally).

Database type 614 indicates a type of the database that includes the resource. For example, results 608A, 608C, 608D, and 608E display an icon that represents PostgresSQL while results 608B and 608F display an icon that represents MySQL.

Table name 616 is the name of the table that matched the search (in this instance because either the name of the table matched the search expression or the name of a column of the table matched the search expression).

Size information 617 may include any suitable information about the size of the resource. In the depicted embodiment, the size information 617 includes the number of columns and the number of rows in the table.

Field preview 618 may include information about the fields of the resource. In the embodiment depicted, field preview 618 includes the names of the first five columns of the table as well as the data type for each of the columns. In other embodiments, field preview 618 may include any number of column names.

A result 608 may also include a database explorer option 620 that a user may select to view metadata about the database that includes the resource and/or the actual database contents. In some embodiments, the results 608 may only include metadata, while the information returned through the interface provided after the database explorer option 620 is selected may additionally include database contents (e.g., field values, records, etc.). A database explorer interface is described in more detail in connection with FIG. 8.

A result 608 may also include a database preview option 622 that a user may select to view a preview of a database resource (e.g., a table). In various embodiments, when the database preview option 622 is selected, a preview interface is displayed. The preview interface is described in more detail in connection with FIG. 7.

In other embodiments, the results 608 may include any suitable information. For example, a result 608 could include the latest version number of the database of the resource, a date that the database was backed up, an indication of whether the resource includes PII, indications of which columns include PII, edits made to the resource (e.g., which tables or columns were added, dropped, or otherwise changed relative to a different version), other metadata described herein (or changes thereto), or other suitable information.

In various embodiments, the enhanced database search interface 600 may provide any number of filtering options. Using the enhanced database search interface 600, the user may specify which filtering options are to be applied to the search. In various embodiments, the filtering options is used in combination with the search expression in the enhanced search and the results presented via the enhanced database search interface 600 are limited to those matching the filtering options as well as the search expression.

In one example, a search may be filtered by database backup source. For example, the enhanced database search interface 600 may include an option to select one or more sources (e.g., a private cloud, any one or more of backends 106) that are to be included in the search. In some instances, all sources may be selected (either explicitly or by default).

In another example, a search may be filtered to only include one or more types of metadata. For example, the search may be limited to any suitable selection of one or more of file names, machine identifiers, table names, column names, keys, indexes, columns including PII information, or any of the other metadata types referenced herein. In such embodiments, the search expression may be compared against the selected type(s) of metadata to find resources that match the search expression.

In another example, a search may be limited to metadata for the current database backup version for the databases. In another example, a search may be limited to metadata that was part of a change made in a database backup, such as an addition, deletion, or other edit. For example, such an embodiment may be useful when a user is trying to identify when a particular table or column (or other metadata) was added or deleted from a database. In yet another example, the search may include both the metadata for the most recent backup version as well as any changes to the metadata across any number of versions of backups (e.g., all or a subset thereof, such as the last N backups or backups made during a specified date range).

In another example, a search may be limited to a particular date range. For example, the search results may be limited to backups made within that date range.

In another example, a search may be limited to a particular size. For example, the search may be limited to tables with less than N rows, between N and M rows, or greater than N rows (where N and M may be any suitable integers provided by the user). As another example, the search may be limited to tables with less than N columns, between N and M columns, or greater than N columns.

The enhanced database backup searching methods and systems described herein may enable various use cases. Any one or more of the embodiments described herein may enable one or more of the following use cases. In a first use case, a user may search for databases and/or tables with column names that identically match a search expression. In a second use case, a user may search for databases and/or tables that include column names in which a search expression is a portion of the column name. In a third use case, a user may perform a semantic column name search (e.g., a search for a column including "last_name" may return databases with tables that have columns including "family_name"). In a fourth use case, a user may search for columns with certain types or categories of PII data. For example, a user may search for tables that include columns with credit card numbers or financial information. As another example, a user could simply search for tables with columns that include PII data. In a fifth use case, the user may search for a table that has had a particular column (matching the search expression) removed. In a sixth example, the user may search for a table that has had a particular column removed within a specified date range. In a seventh example, a user may search for all databases that are not being backed up and may view a plurality of previews to determine which databases to back up. In an eighth example, a user may view a plurality of previews to determine which databases to restore from a backup stored remotely (e.g., responsive to local deletion of one or more of the databases).

Figure 7:
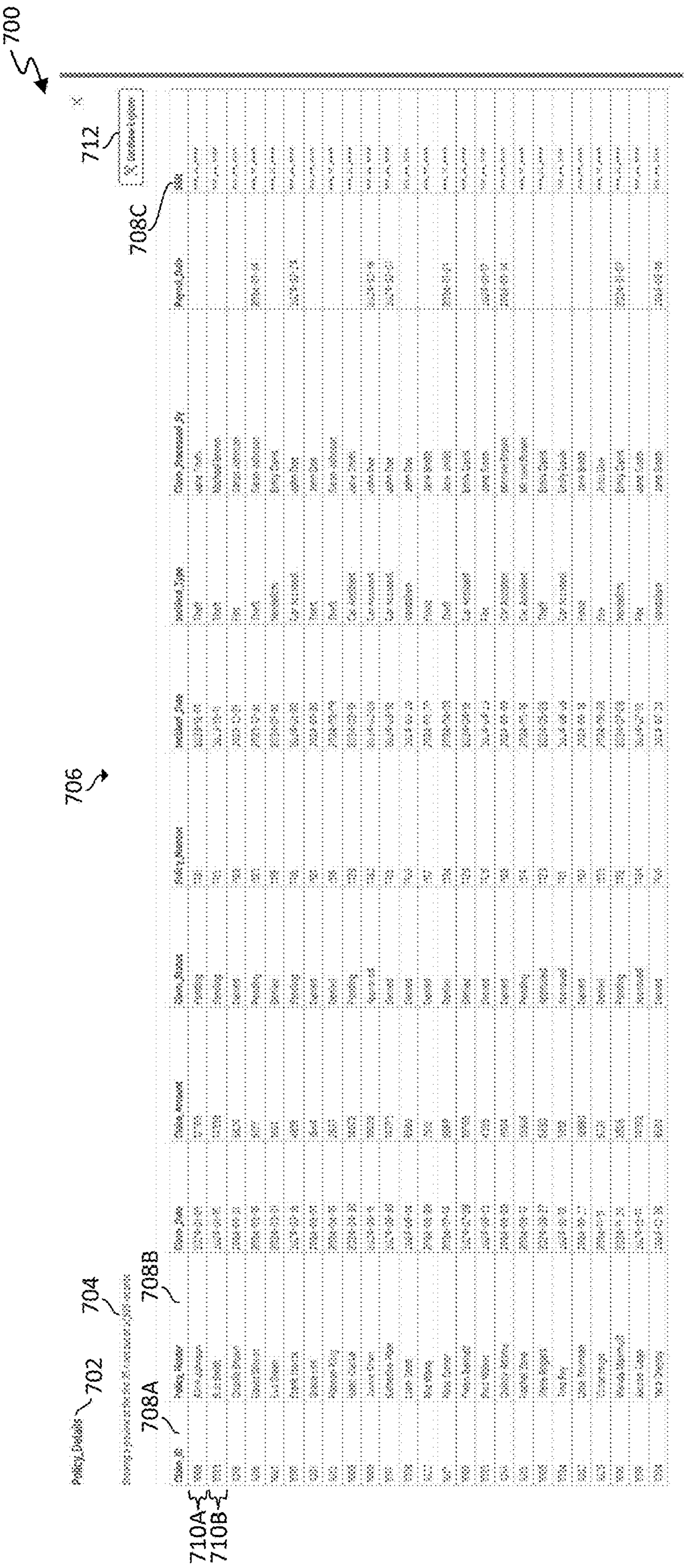
FIG. 7 illustrates a database preview, in accordance with any of the embodiments disclosed herein.

FIG. 7 illustrates a database preview interface 700, in accordance with any of the embodiments disclosed herein. The database preview interface 700 may be displayed by the same device (e.g., a computing device 102) as the enhanced database search interface 600. In this embodiment, the database preview interface 700 is provided through a web application (e.g., accessed through a web browser executed by a computing device 102), but could also be provided through a native application or by other suitable means.

In some instances, the database preview interface 700 may be displayed responsive to a selection of a result (or an option within a result) of a search as described above. In other embodiments, the database preview interface 700 may be displayed responsive to other suitable action (e.g., selection of a database resource from an inventory of available database resources).

In the embodiment depicted, database preview interface 700 includes a name 702 of the selected table, size information 704 (in this instance, the size information 704 includes the number of records in the table as well as the number of records that are displayed in the preview).

The database preview interface 700 displays a database preview 706. The database preview 706 includes column names 708 (e.g., 708A, 708B, 708C, and so on). The database preview 706 includes records 710 (e.g., 710A, 710B, and so on). Each record 710 includes a value (or a null value) for each column. For example, the record 710A includes a value of 1308 for the column Claim_ID, a value of Alice Johnson for the column Policy_Holder, and so on. In the embodiment depicted, the column SSN includes PII, and thus the values in this column are obfuscated (e.g., represented by asterisks) to prevent disclosure of this information to the user.

The database preview interface 700 also includes a database explorer option 712 that a user may select to view metadata about the database that includes the table previewed by the database preview interface 700 and/or data from the tables of the database. For example, after a user previews the database and determines that it is the database the user is looking for the user may select the database explorer option 712 to view additional information from the database or to perform other database operations.

Although not shown, in some embodiments, database preview interface 700 may include a version selector. When multiple versions of a database have been backed up (e.g., at different points in time), the user may select which version to preview. For example, a version slider may be presented in the database preview interface 700 that the user may use to select the version associated with the table preview that is to be shown. In a particular embodiment, the version slider may be arranged from the older version on one side to the newest version on the other side. In some embodiments, the latest version of the table may be selected by default.

Figure 8:
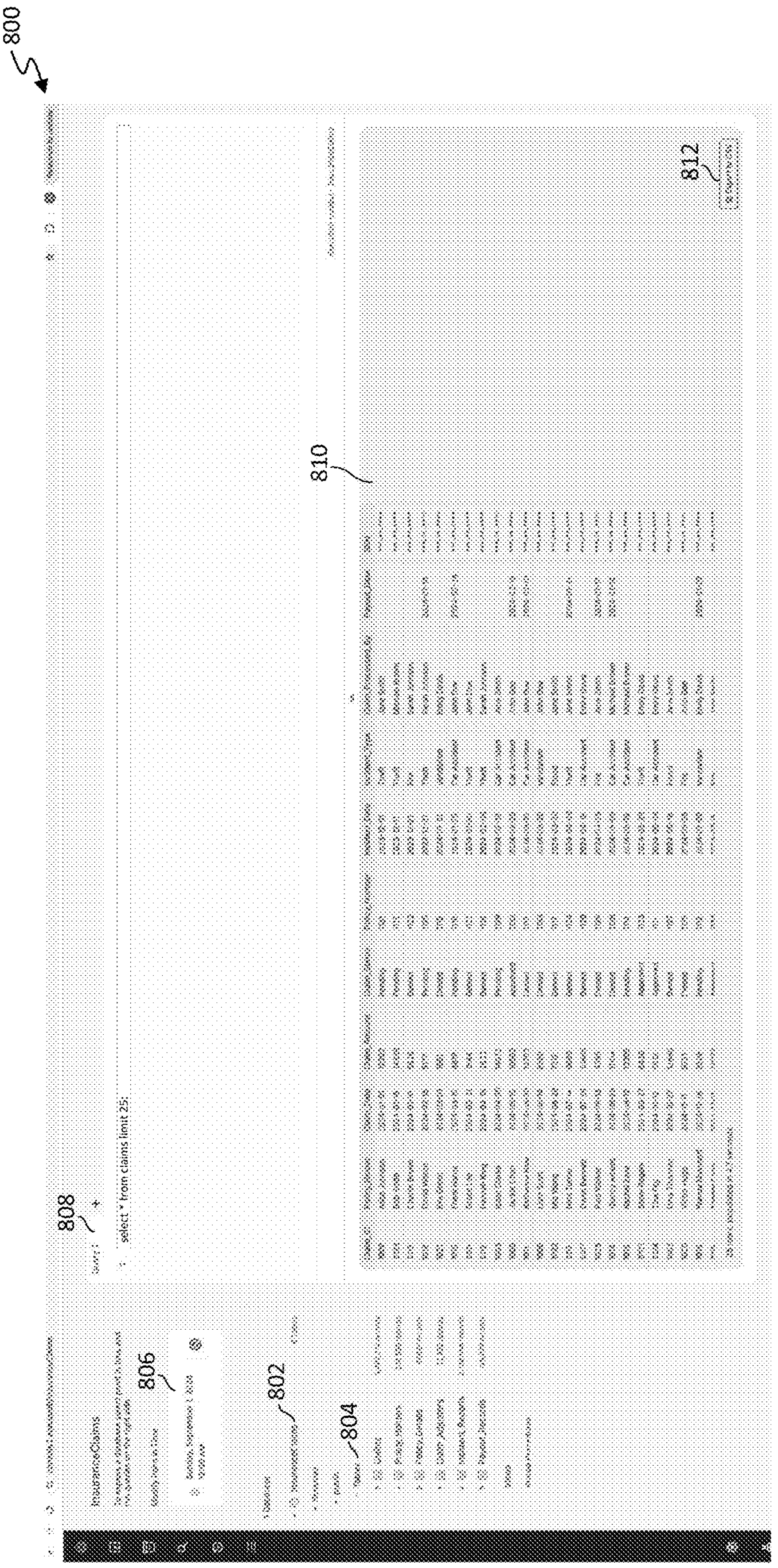
FIG. 8 illustrates a database explorer for submitting queries to partitioned database backups, in accordance with any of the embodiments disclosed herein.

FIG. 8 illustrates a database explorer 800, in accordance with any of the embodiments disclosed herein. The database explorer 800 may be displayed by the same device (e.g., a computing device 102) as the enhanced database search interface 600 or database preview interface 700. In this embodiment, the database explorer 800 is provided through a web application (e.g., accessed through a web browser executed by a computing device 102), but could also be provided through a native application or by other suitable means.

The database explorer 800 includes a navigation menu on the left which includes a database name 802 and table names 804 of the tables in the database (as well as corresponding table size information including the number of records of each table). The database explorer 800 may also include a version selector 806. When multiple versions of a database have been backed up, the user may select which version to perform database operations on (e.g., which version to send SQL queries to). For example, in the embodiment depicted, each version may be distinguished by the point in time at which the database was backed up. In some embodiments, the latest backup version may be selected by default.

Once a user has selected a version, the user may enter a query in the query interface 808. The query may initiate an access to Parquet files storing the records of one or more tables of the selected version of a partitioned database backup to read from or write to the tables. The query interface 808 may support any suitable SQL queries, such as SELECT queries to return records from one or more tables, INSERT INTO queries to insert new records into a table, UPDATE queries to modify existing records in a table, DELETE queries to delete existing records in a table, CREATE VIEW queries to create a view, ALTER TABLE queries to add or delete a column or to change the data type of a column, CREATE to create a new table, or other suitable SQL queries. In some embodiments, the query interface 808 may support commands that read from tables but not commands that edit tables, so as to not allow changes to the records of the partitioned backup.

In the embodiment depicted, the user has entered the SQL query "select * from claims limit 25" to select the first 25 records of the "Claims" table. Data read from the relevant Parquet or other file(s) of the database via a query may be displayed in the results interface 810. The results interface 810 may also include an export option 812 to export data (e.g., records) that are returned from a query in the results interface 810. In the embodiment depicted, the export option 812 is operable to export the data into a comma separated value (CSV) format.

In some embodiments, a query of the database explorer 800 may be run against multiple versions of a database backup (e.g., all available versions or a subset of the available versions selected by the user). For example, a SELECT query directed at a particular table may be run on each table of each version of the database (or on a plurality of versions selected by the user). For example, a user may desire to view salary numbers that may have changed across multiple versions of a database. The user may submit a query for the salary numbers and a plurality of results (each corresponding to a version of a table) may be provided to the user.

Figure 9:
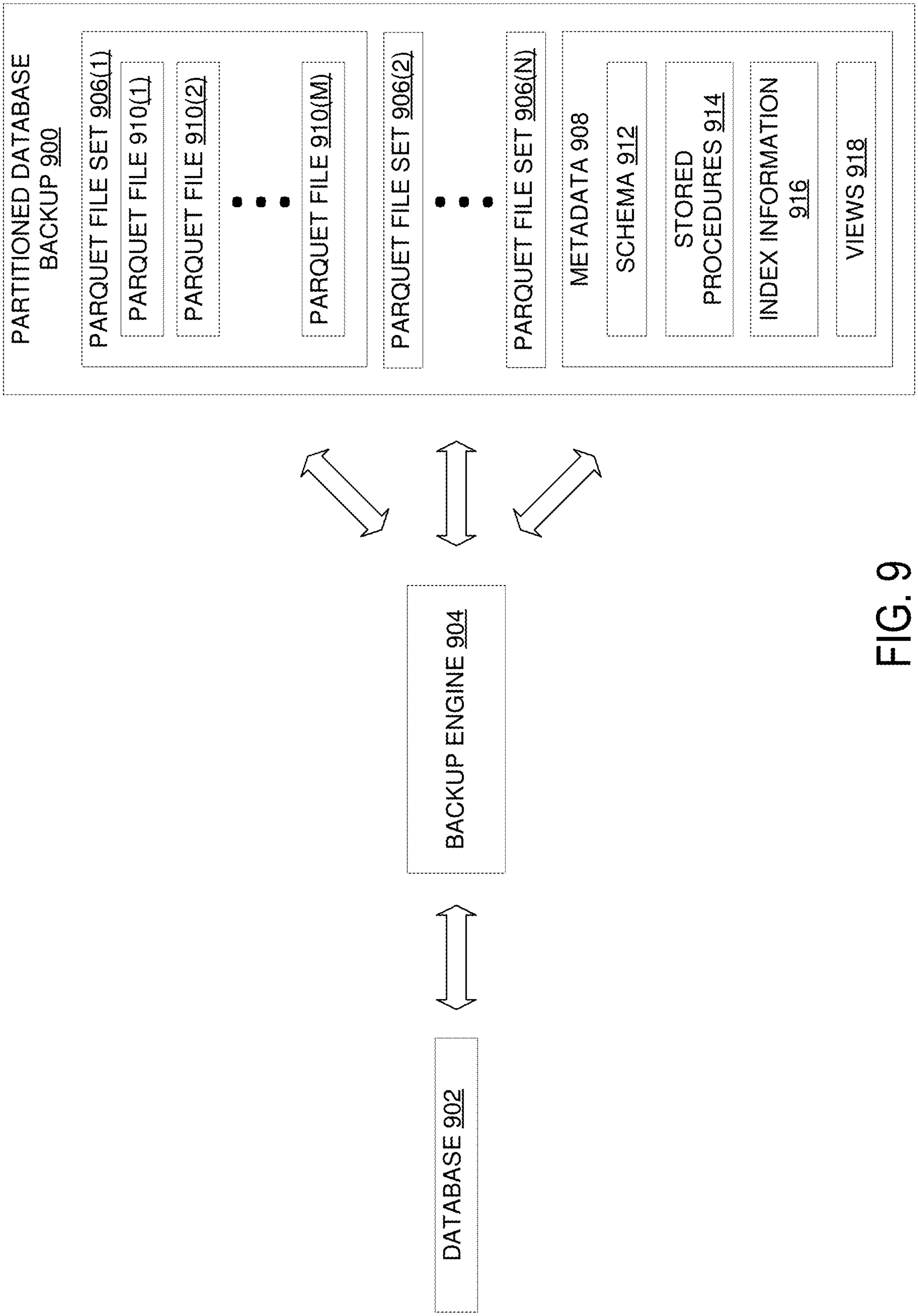
FIG. 9 illustrates a partitioned database backup, in accordance with any of the embodiments disclosed herein.

FIG. 9 illustrates a partitioned database backup 900, in accordance with any of the embodiments disclosed herein. A database 902 may be accessed by a backup engine 904, which generates the partitioned database backup 900 based on the contents of the database 902 in a format that allows the backup engine 904 to recover the database 902 (e.g., the format of the recovered database may match the format of the database 902) and to service SQL queries sent to the database backup. In various embodiments, the backup engine 904 may also be operable to perform operations to recover the database 902 from the partitioned database backup 900.

The backup engine 904 may be included, in whole or in part, within the database backup and search system 108, within a backend 106, at another suitable location within cloud database backup environment 100, or at any combination thereof. The backup engine 904 may be implemented by one or more computing devices, such as computing devices 300.

The partitioned database backup 900 includes a plurality of Parquet file sets 906 (e.g., 906(1), 906(2), . . . , 906(N), where N is any suitable integer). Each Parquet file set 906 corresponds to a table of the database 902 and may include any number of Parquet files 910 that collectively store the records of the table. For example, Parquet file set 906(1) includes Parquet files 910(1)-910(M), where M is any suitable integer.

The records of the table corresponding to a Parquet file set 906 may be split among the Parquet files 910 in any suitable manner. In a particular embodiment, a column (e.g., a primary key or a different column) is selected for the table and the records are split among the Parquet files 910 according to the values of the selected column in the various records. The full range of values for the selected column in the records of the table may be determined, the full range may be split up into partial ranges (e.g., that collectively span the full range), each partial range may be assigned to one of the Parquet files 910, and the records of the table may be stored among the Parquet files 910 according to their values for the selected column. For example, a first Parquet file 910(1) may include records having values for the selected column that are within a first range, a second Parquet file 910(2) may include records having values for the selected column that are within a second range, and so on.

As a simplified example, a table with 1,000,000 records that each include a unique value for the selected column may be partitioned, e.g., into 100 Parquet files. If the values for the selected column span from 1 to 1,000,000 in the records (with no repeated value for the selected column), a first Parquet file may include the records that have values for the selected column from 1 to 10,000, a second Parquet file may include the records that have values for the selected column from 10,001 to 20,000, a third Parquet file may include the records that have values for the selected column from 20,001 to 30,000, and so on. In various embodiments, the values of the selected column may or may not be unique and Parquet files for the same table may or may not have the same number of records.

In general, a Parquet file is a columnar storage file format commonly used in the Hadoop ecosystem, though it is supported in a variety of other data processing frameworks (e.g., AWS Athena, Apache Spark, Google BigQuery, etc.). Parquet files store data in columns (using column oriented storage), rather than rows, allowing for more efficient reading of specific columns (without the need to read the entire dataset), resulting in faster query times. Thus, the ordering of the data in a Parquet file may be as follows: C1 R1, C1 R2, C1 R3, . . . C1 RN, C2 R1, C2 R2, C2 R3, . . . C2 RN, C3 R1, C3 R2, C3 R3, . . . C3 RN, CM R1, CM R2, CM R3, . . . , CM RN (where C stands for column, R stands for row, and M and N are any suitable integers). R1 through RN may include all of the rows in the Parquet file or all of the rows of a particular row group (and the Parquet file could include one or more additional row groups. The data may be compressed and/or encrypted in any suitable format.

Metadata 908 may include metadata for the database 902 that may be used in conjunction with the Parquet file set 906 to reconstruct the database 902. Metadata 908 may be stored separately from the Parquet file sets (e.g., in one or more files, objects, or other storage structures that are distinct from the Parquet files 910). In various instances, metadata 908 may be stored in association with the Parquet file sets (e.g., in the same storage device, the same storage device group, the same backend 106, etc.).

In the embodiment depicted, metadata 908 includes schema 912, stored procedures 914, index information 916, and views 918. In other embodiments, metadata 908 may include additional information or any subset of this information.

Schema 912 may include any suitable information about the organization of the database 902, such as any information described above with respect to schema information 406. In various embodiments, the schema 912 may include a list of table names of the database 902 as well as the column names and data types for each column of each table. In various embodiments, schema 912 of a database or table may be stored in one or more Parquet files (e.g., that are different from the Parquet files used to store the table records) or other suitable file type.

Stored procedures 914 are collections of one or more SQL statements that are stored and executable on a database server. This allows for modular, reusable code that can be called repeatedly, e.g., to perform complex tasks such as querying, updating, or processing data. Stored procedures 914 may be compiled and/or optimized by a database management system when they are created (potentially enabling faster execution than if the SQL statements were executed individually). In some instances, the stored procedures 914 may include security permissions (e.g., users may be allowed to execute a stored procedure even though the user does not have rights to directly access the underlying tables). In some instances, stored procedures may accept input parameters and/or return output parameters.

Index information 916 may include any suitable information about indexes of the table, such as any of the information described with respect to index information 408.

Views 918 store information describing views of the database. A view in SQL is a virtual table based on the result set of a SQL query. A view functions like a table but doesn't store data itself; rather may dynamically retrieve data from one or more underlying tables when queried. Views are generally used to simplify complex queries (e.g., a view may allow the results of a complex query to be treated as a table), encapsulate logic (e.g., by hiding the complexity of database schema, such as joins or subqueries), enhance security (e.g., views can be used to restrict access to certain rows or columns in a table, users may be given access to a view without receiving direct access to the underlying tables), and provide a layer of abstraction.

The partitioned database backup 900 may be stored in any suitable location. For example, the partitioned database backup 900 may be stored at a backend 106 (e.g., in storage of the backend 106 allocated to the particular organization). In a particular embodiment, the partitioned database backup 900 is stored in an object storage service of a backend 106, such as an Amazon Simple Storage Service (Amazon S3) environment.

Figure 10:
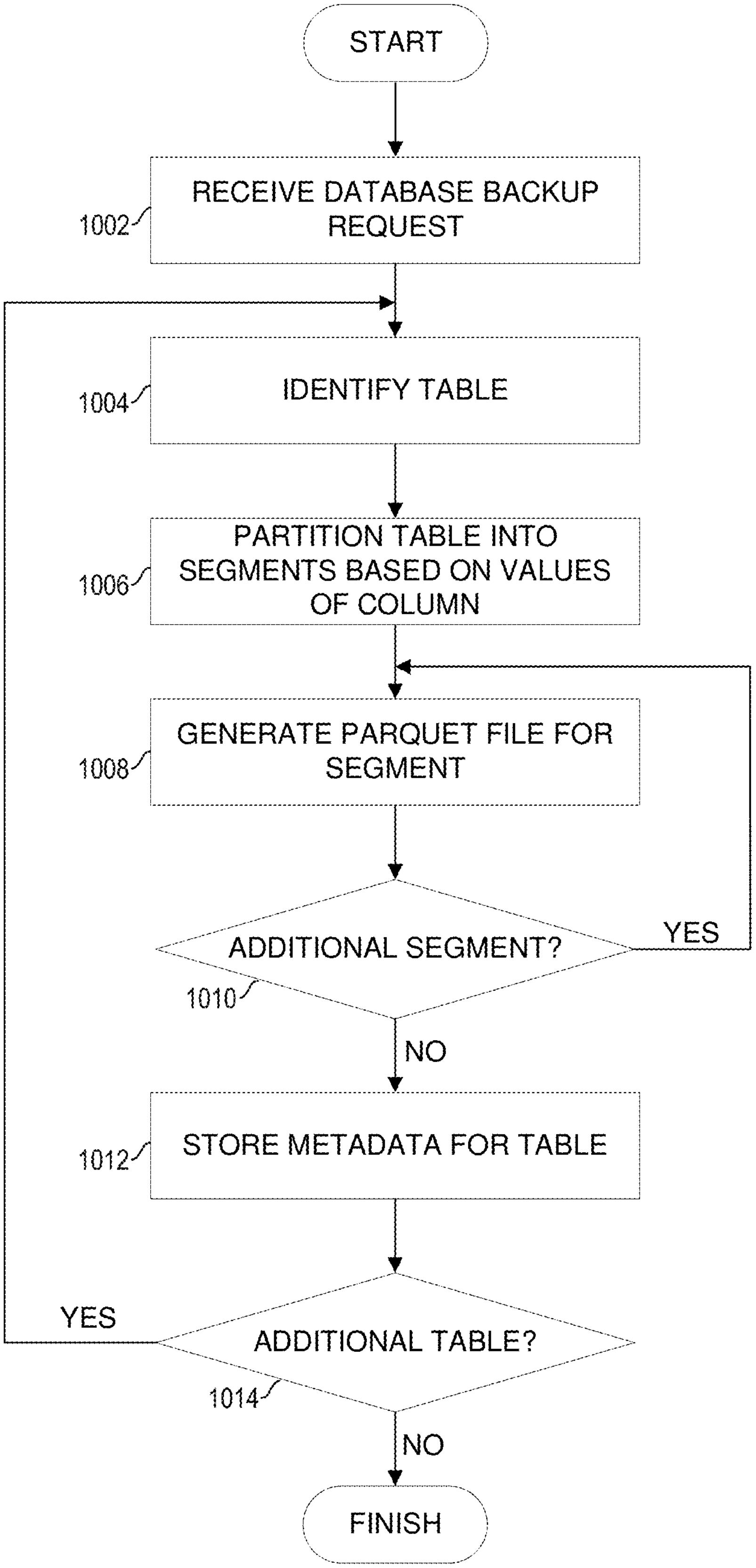
FIG. 10 illustrates a flow for generating a partitioned database backup, in accordance with any of the embodiments disclosed herein.

FIG. 10 illustrates a flow for generating a partitioned database backup, in accordance with any of the embodiments disclosed herein. At 1002 a request to generate a database backup is received. For example, the request may be made via a user interface (e.g., of a web application, native application, or other logic) executed by a computing device 102. The request may be sent, e.g., by a computing device 102 to a backup engine 904 (e.g., implemented by a database backup and search system 108, backend 106, and/or other logic). The request may include any suitable identifier(s) of the database to be backed up that allows the backup engine 904 to access the database, such as the name of the database, a location of the database, or other suitable information.

At 1004, a table of the database to be backed up is identified. At 1006, the table is partitioned into segments based on values of the rows for a particular column of the database (e.g., a primary key or other suitable column). Each segment may correspond to a distinct range of values of the column. In some embodiments, the ranges of the segments may all be equal or substantially equal in size (e.g., each segment will include the same number of records). In other embodiments, the ranges for all of the segments except for one may be the same size while the range of one segment is smaller or larger than the other segments (e.g., the last range may include the remainder of records after the other records are evenly split). In yet other embodiments, the ranges may differ for the segments in any suitable manner.

In some instances, the column values used as the basis for the segmentation are consecutive and unique (e.g., not repeated). In other instances, the column values are not consecutive (e.g., a first value for the column may be 1 and the next largest value for the column may be 4) and/or are not unique (e.g., multiple rows may include the same value for the column). In various instances, the backup engine 904 may base the segmentation upon a distribution (e.g., as represented by a histogram) of the values of the column. In various embodiments, the backup engine 904 may segment the table based on a desired Parquet file size or file size range (e.g., the segmentation may be performed such that the resulting Parquet files are between 16 and 128 MB in size). In doing so, in some embodiments, the backup engine 904 may take into account an estimated compression ratio of the data of each segment within a Parquet file (or the average compression ratio across the data in the table). In various embodiments, the backup engine 904 may maintain a minimum size for the Parquet files (or at least for a majority of the Parquet files) for a table so as to strike a balance between the number of objects that are accessed responsive to a query and the speed of the query (as each object accessed by a database query tool such as Amazon Athena may result in a charge to the user or organization).

In one embodiment, the backup engine 904 chooses the column to be used as the basis for segmentation. As just one example, the backup engine 904 may identify a primary key defined in a schema for the database and use the primary key as the selected column for the segmentation. In some instances, a user may provide a selection of the column to be used as the basis for segmentation (e.g., the user may override a column selected by the backup engine 904).

At 1008, a Parquet file is generated for a segment of the table. The Parquet file may include the records that have values for the selected column within the range of values corresponding to the segment. At 1010, if an additional segment remains, the flow returns to 1008 and a Parquet file for another segment of the table is generated.

In various embodiments, the records for the Parquet files may be retrieved from the database in any suitable manner. In some instances, the backup engine 904 generates SQL queries for the database based on the ranges of values of the column (e.g., primary key) used as the basis for segmentation. Each query may then be run against the database to obtain the data to be included in the corresponding Parquet file. In some examples, the Parquet files are generated by the backup engine 904 using a database wrapping tool (e.g., DuckDB) or other logic to copy tables (or portions thereof).

After accessing the appropriate records, the data is written in the Parquet file format. In some instances, at least some of the data types in the tables may be converted to a format that is supported by the Parquet file format. When such a conversion is performed, the backup engine 904 may store an indication thereof so that the reverse conversion may be performed when restoring the table of the database. In addition, extra data may be kept (e.g., in partitioned database backup 900) to enable full reverse conversion of the data to recover the data in its original format. For example, if a data type of a column of a table is not supported by Parquet, the data of the column may be kept in two formats. A first format may be a lossy conversion of the data that is stored in the Parquet files and allows for fast querying as described herein. A second format may be a format that allows the original data to be recovered in its original format when the backup of the table is restored. For example, the data of the column may also be kept in a string format. In various embodiments, the data in the second format is stored in one or more separate files from the data in the first format (the Parquet files accessed for the fast querying). In some instances, the data in the second format may be stored in one or more Parquet files that are different from the Parquet files that store the table records).

When converting to and from the Parquet format, some data types might encounter issues due to the way Parquet handles data and thus may be stored as the extra data referred to above (e.g., this data may be stored in multiple formats in the backup as described above). The following types of data may encounter such issues. Complex nested types—highly nested or recursive data structures can face issues, especially if deeply nested in fields like JSON objects or certain hierarchical formats. Time zones in timestamps—Parquet supports timestamps but doesn't retain time zone information directly. When timestamp data is written with a time zone, this detail may be lost or mishandled during conversion. Variable-length binary data—Parquet handles fixed-length binaries efficiently but can struggle with variable-length data like arbitrary binary blobs, potentially leading to inconsistent or truncated data when converted back during a restore operation. Non-UTF8 Strings—Parquet supports only UTF8-encoded strings, thus if the original table has strings encoded in other formats (e.g., UTF-16 or ISO-8859-1), converting to the Parquet format and then converting back can result in corrupted text or errors. Mixed data types in columns—Parquet enforces a strict schema per column, thus if a column contains mixed data types such as integers and strings, the inconsistencies can cause issues on conversion or require casting. Sparse data or data with high cardinality—columns with sparse data (mostly nulls) or high cardinality (e.g., UUIDs, random strings) may not translate as efficiently, possibly leading to large file sizes or performance issues.

When working with time zones in Parquet, time zone information can be handled with a few workarounds (as Parquet does not natively store time zones in timestamps). In a first embodiment, the time zone may be stored as a separate column. For example, timestamps may be converted to UTC before saving to Parquet in order to standardize the timestamps. A separate column may be added to explicitly store the time zone as a string. For instance, if a timestamp column has an event_time and the events are in America/New_York, a column called timezone with the value America/New_York may be added. When restoring the data back into its original format, the localized timestamp may be reconstructed using both the UTC timestamp and the time zone column.

In a second embodiment, timestamps may be converted to UTC without an additional column. Thus, only UTC timestamps are stored without adding a time zone column. This approach works well if an application always uses UTC or does not need to revert to local times.

In a third embodiment, the timestamp may be converted to a string format (e.g., ISO 8601) before saving to Parquet. ISO 8601 strings can include time zone offsets, which are preserved as text. An example of such a string is "2023-11-06T12:00:00-05:00." The strings may be stored in a Parquet file, and when the data is restored, the ISO strings may be parsed back into timestamps with the timezone information.

In addition to the extra copy of the data that is stored, any suitable metadata providing instructions on how to restore the original format of the data from the extra data may also be stored in the backup. In some instances, when the data is stored in a different format in the Parquet files as compared to its original format, instead of storing an extra copy of the data, the backup engine 904 may simply store instructions on how to restore the original format of the data from the data in the backup or other data indicative of the inverse relationship such that the backup engine 904 may read such data and automatically recover the original format of the data (e.g., the backup engine 904 may execute the stored data or use the stored data as a parameter to logic executed to recover the original format).

In various embodiments, the Parquet files may be generated serially or in parallel (e.g., different threads running on the backup engine 904 may each concurrently be performing processing to generate a Parquet file). In one example, a first processing thread of the backup engine 904 may submit a first SQL query with a first range to a table and cause a first Parquet file to be generated based on the results, a second processing thread of the backup engine 904 may submit a second SQL query with a second range to the table and cause a second Parquet file to be generated based on the results, and so on (where multiple threads may be run in parallel). In other embodiments, multiple Parquet files for the same table may be generated in a serial fashion by the same processing thread.

The Parquet files may be stored in any suitable location or structure. In one embodiment, the Parquet files are stored within a backend 106. In one example, each Parquet file is stored in an S3 object.

At 1012, metadata for the table is stored. This may include extracting any one or more of schema, stored procedures, index information, views, or other metadata associated with the table and storing this metadata in one or more files or objects. In various embodiments, a database's native backup application may be leveraged by the backup engine 904 to extract the metadata (e.g., views, stored procedures, indexes, or other configuration data) and store it in the database's native format. For example, for a postgres database, pg_dump may be used to extract the metadata for the database backup. As another example, for a MySQL database, mysqldump may be used to extract the metadata for the database backup. In some embodiments, all or a portion of the metadata (e.g., stored procedures) may be extracted by querying the database directly, though typically native database tools simplify the process of extracting the metadata.

At 1014, a determination as to whether the database includes at least one additional table is made. If the database includes at least one additional table, the flow returns to 1004 where another table of the database is identified. Parquet files are generated for the table in a manner similar to that described above and metadata for the table is stored. In various embodiments, the metadata may be stored in the same one or more files or objects as the metadata for one or more other tables of the database or in one or more separate files or objects.

Once all tables of the database have been processed in this manner, the flow completes. Thus, when a database 902 is to be backed up, the database 902 is accessed by the backup engine 904 which partitions the data of the tables of the database 902 and generates the Parquet file sets 906 with each Parquet file including a portion of the partitioned data. The backup engine 904 also extracts the various metadata of the tables of the database 902 and stores this in metadata 908.

Database 902 (or a table thereof) may be recovered in a reverse fashion (e.g., responsive to a request from a user received via a user interface executed by a computing device 102). For a particular table, the records from the various Parquet files of a Parquet file set 906 are combined to form the corresponding table of the database 902. The metadata from metadata 908 is also accessed and files of the database 902 are reconstructed based on the metadata. In various embodiments, the recovered files of the database 902 are identical or substantially identical to the files of the database 902 before it is backed up. In some instances, the files may differ only in a non-substantive manner (e.g., the recovered files may include metadata indicating a time of recovery or other information associated with the recovery). In some instances, one or more of the original and restored files that include particular metadata have an extension type that is different from the extension type of a file in the metadata 908 that backs up the particular metadata.

Any suitable logic may be used to perform the restoration of the database 902. In some instances, a native tool of a database (e.g., pg_restore) may be used to restore metadata such as the database schema, stored procedures, index information, views, or other suitable metadata. In some instances, native tools may also be used to restore the table data from the Parquet files. In other instances, logic of the backup engine 904 may restore the data into a table by issuing SQL commands (e.g., CREATE to create a table and INSERT INTO to move records into the table). When the data is restored, an inverse conversion is performed on any data types that were converted into a different format for the Parquet files to restore the table data into its original format. For the data types that weren't supported by the Parquet format and for which an extra copy was stored, the data may be converted from the format (e.g., string format) in which it was stored back to its original format. Any one or more native database tools and/or custom logic of the backup engine 904 may be used to restore the table data and/or metadata.

Figure 11:
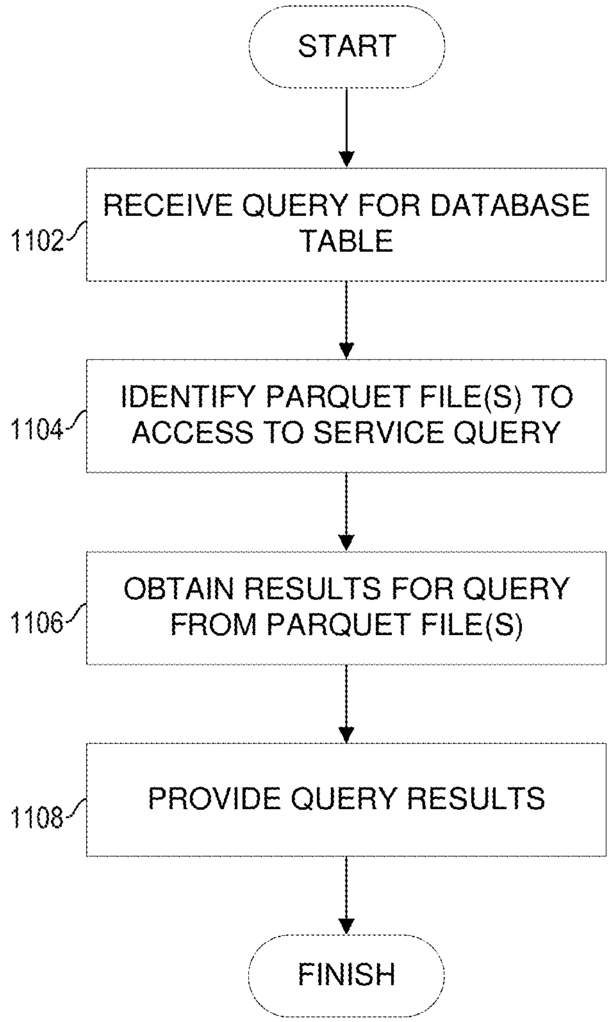
FIG. 11 illustrates a flow for servicing a query from a partitioned database backup, in accordance with any of the embodiments disclosed herein.

FIG. 11 illustrates a flow for servicing a query from a partitioned database backup, in accordance with any of the embodiments disclosed herein. Any of the operations of the flow may be provided by database backup and search system 108, a backend 106, other suitable logic, or a combination thereof. In some instances, any of the operations may be performed by a database backup and search system 108 or by a backend 106 at the request of the database backup and search system 108.

At 1102 a query is received for a database table. For example, a user may enter a query in a query interface (e.g., query interface 808 of a data explorer as shown in FIG. 8). In various embodiments, the query may be a SQL query. The query may be sent over a network from a computing device 102 to the database backup and search system 108 or a backend 106. The query may be associated with a particular version (or point in time) of a table of a database. For example, prior to submitting the query, the user may select the database and the version that is to be queried. In various instances, the query that is sent from a computing device 102 of a user to the database backup and search system 108 or backend 106 over the network 104 may include an SQL query as well as an indication of the version of the database that is to be queried.

At 1104, one or more Parquet files that are to be accessed to service the query are identified. For example, the Parquet files may be identified based on the table to be queried and/or parameters included in the query. For instance, each table may be associated with one or more Parquet files and a query for that table is limited to the associated Parquet files. In some embodiments, the Parquet files themselves may include metadata for the records that are included within the Parquet files. For example, the Parquet files may include minimum and maximum values for one or more columns in the Parquet files that may be used to determine whether the particular Parquet file should be searched based on the query (e.g., if the search criteria does not fall between the minimum and maximum value then Parquet file may be omitted from the search). In some instances, such metadata may be stored outside of the Parquet files (e.g., by the database backup and search system 108 or by backend 106) and may be used to limit the queries that are sent to Parquet files stored at a backend 106.

In various embodiments, the database backup and search system 108 may utilize a query service of a backend 106 at which the partitioned database backup 900 is stored in order to query the Parquet files of the partitioned database backup 900 (while in other embodiments, the database backup and search system 108 may perform the queries or provide logic to the user interface of computing device 102 in order to perform the queries). For example, the SQL request may be provided to Amazon Athena which may then perform the query on the Parquet files in a backend 106. In various embodiments, the user interface executing on a computing device 102 may send the SQL queries to the query service directly or may send the queries to the database backup and search system 108 which may then send the requests to the query service.

Amazon Athena is an interactive query service provided by AWS that allows for querying of data stored in Amazon S3 objects using standard SQL and is based on the open-source Presto distributed SQL query engine. Amazon Athena is serverless in that it doesn't require an organization to manage the database infrastructure (charges are simply based on queries run by a user). Amazon Athena may also integrate with AWS Glue to use the AWS Glue Data Catalog for schema management.

At 1106, results are obtained from one or more Parquet files responsive to the query. At 1108, the results are provided. For example, the results may be communicated over network 104 to a computing device 102 for presentation in a user interface (e.g., results interface 810).

Figure 12:
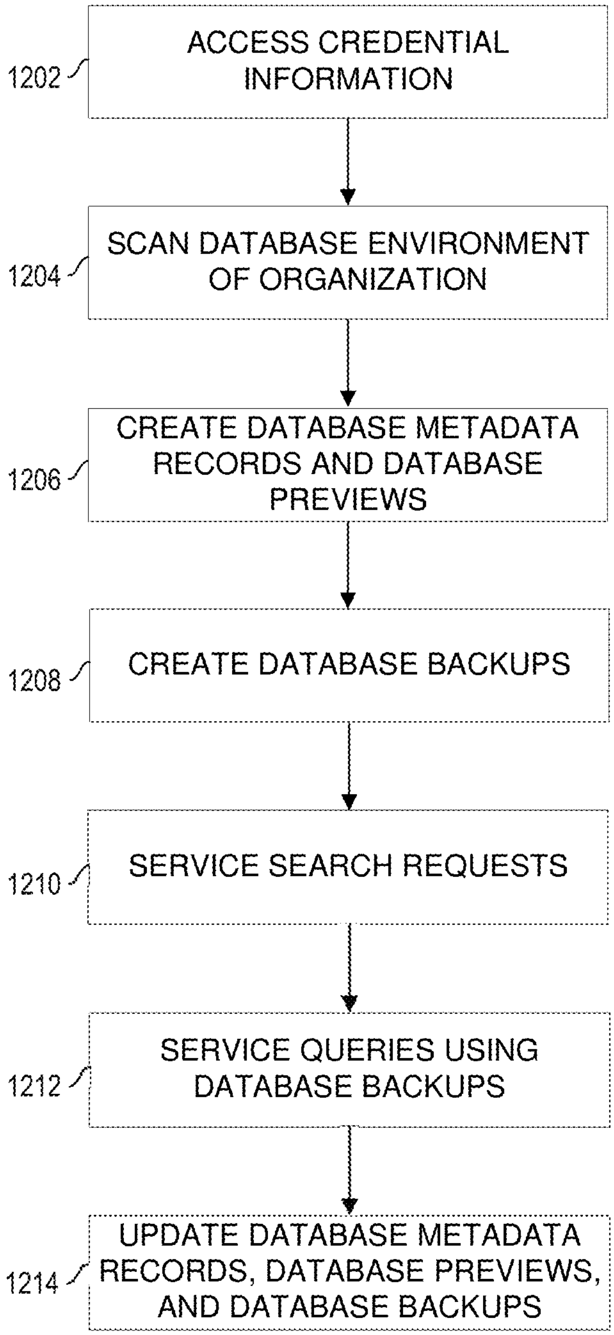
FIG. 12 illustrates an example flow for setting up enhanced searching, previewing, and querying of databases for an organization, in accordance with any of the embodiments disclosed herein.

FIG. 12 illustrates an example flow for setting up enhanced searching, previewing, and querying of databases for an organization, in accordance with any of the embodiments disclosed herein. The operations of the flow may be performed, e.g., by the database backup and search system 108 alone or in combination with other suitable logic (e.g., enhanced database search interface 600, database preview interface 700, database explorer 800, etc.).

At 1202, credential information is accessed. In some instances, the enhanced database searching functionality may be provided as a service to a plurality of different organizations (or other users). When an organization registers to use the service, the organization may provide credentials (e.g., usernames, passwords, etc.) for accessing the databases of the organization. The organization may also provide any other suitable information needed to provide access to the databases, such as cryptographic keys for decrypting the databases. The organization may also grant access (e.g., read only access) to the databases of the organization to the enhanced search service provider (e.g., the operator of database backup and search system 108). In some embodiments, the organization may delegate access to databases in one or more backends 106 using an IAM role that grants read access, e.g., to the database backup and search system 108.

At 1204, computing resources associated with the organization are scanned to identify the database resources (e.g., databases or components thereof). Any suitable computing resources may be scanned to identify the database resources, such as one or more local machines, local clouds, backends 106, other suitable computing resources, or combinations thereof. A database that is to be backed up may be present in any suitable locations, such as within a virtual machine running on the premises of the organization, in a backend 106 (e.g., in EC2), or other location; within a managed database service in a backend 106 (e.g., RDS); within a production environment (e.g., with a backend 106 or on premise); or other suitable location.

Snapshots of the identified database resources (including any suitable information that may be used to generate the database metadata records 400 and/or database preview records 500) may be created. For example, the snapshot may comprise a backup copy of the database, allowing restoration of a copy of the database at a particular point in time (also referred to herein as version). In some embodiments, the snapshots are copied to the database backup and search system 108. For example, these snapshots may be transferred to the organization's account (e.g., within database backup and search system 108). In some instances, the database backup and search system 108 may utilize an API of a backend 106 to use logic of the backend to create and/or access the snapshot. Copying the snapshot to the database backup and search system 108 may allow access to the database without disruptive operations to the production environment (and without the risk of data corruption during the scanning process). In other embodiments, the databases could be accessed in any other suitable manner. For example, in addition to or as an alternative to creating snapshots, one or more databases may be accessed directly (e.g., an organization may grant access to its production databases or read only copies of its databases to the database backup and search system 108 or other entity that creates the previews) without the need to create and restore snapshots for some or all of the databases.

At 1206, database metadata records 400 and database preview records 500 are created based on the snapshots. For example, the various databases of the organization may be iterated through. For a particular database, the snapshot corresponding to the database may be used to restore the database and then the database may be scanned for the relevant metadata and data. In some embodiments, when a database is to be analyzed, a virtual machine is created and attached to the database. The metadata of the database is then scanned and extracted to create a database metadata record 400 for the database. Data of the database may also be scanned (and be used in conjunction with the metadata of the database) to create the database preview record 500 for the database. In some instances, various backup versions of a database may be scanned to obtain information on historical changes that occurred to the metadata and such changes are captured within the database metadata record 400. Similarly, data and metadata of the backup versions of a database may be scanned to create a database preview record 500 for each version of the database. In some embodiments, the database metadata records 400 and database preview records 500 may be stored together (e.g., in database backup and search system 108, on storage resources associated with an account of the organization, etc.).

In various embodiments, the database metadata records 400 may be organized in any suitable manner. In some embodiments, the database metadata records 400 may be aggregated together into a database (e.g., a relational (e.g., SQL) database or a noSQL database). In one embodiment, the database metadata record 400 are placed in an ElasticSearch database. In other embodiments, the database metadata records 400 may be stored as a set of indexed objects that can be read by a database or in other suitable manner (e.g., when a user submits a search, the objects may be iterated through to find the database resources that match the search). For example, because the amount of data is relatively small (even for a large number of databases), the metadata may be placed in objects (e.g., an object per database or an object per table) and the objects may be read responsive to a search. In some examples, historical metadata for a particular database and table may be aggregated together, e.g., based on the database name and table name. In general, the database metadata records 400 are stored in a format that is easily searchable.

In some embodiments, each database metadata record 400 for a table includes a time (e.g., the time that the table was backed up), a table name, a number of rows in the backup, and a list of columns (with a column name and a type of data of the column).

The database preview records 500 or portions thereof may also be organized in any suitable manner. In some embodiments, the database preview records 500 may be stored in objects (e.g., in a text format, compressed text format, or other suitable format), such as Amazon S3 objects or similar data structures. In various embodiments, table previews 502 for the same database may be stored together in the same object, may each be in separate objects, or some objects may include multiple table previews 502 for the database while other objects include a single table preview 502. In some instances, an object may include multiple table previews 502 for different versions of the same table. In yet other embodiments, the table previews 502 may be stored in Parquet files, within a database, as text files, as image files, or in other suitable formats.

At 1208, database backups are created. In various embodiments, at least some of the database backups may be created by accessing the snapshots described above. In some embodiments, at least some of the database backups may be created by accessing the databases themselves. As described above, in some embodiments, a database backup may include one or more Parquet files for each table of the database as well as a collection of metadata for the database.

In various embodiments, the Parquet files may be stored in a backend 106 and the backup engine 904 may configure a backend tool comprising any suitable logic with the table names, locations, and/or other identifiers of the Parquet files so as to enable the backend tool to locate the appropriate Parquet files responsive to a SQL query specifying a particular table. For example, a backend tool (e.g., AWS Glue) may be used to define the table scheme and the locations of the Parquet files so that a query tool provided by the backend 106 (e.g., Amazon Athena) may locate the files and perform queries on the files responsive to requests received from a computing device 102, database backup and search system 108, or other suitable computing device. For example, a metadata file with locations of the Parquet files may be created and then AWS Glue may be used to export the metadata file to Amazon Athena.

At 1210, search requests are serviced by providing database metadata records (or information from such records) responsive to the search requests. In various embodiments, the database backup and search system 108 may receive a search expression and/or filtering options and provide the database metadata records that match the search expression and/or filtering options (e.g., to a user via a web application that utilizes a user interface such as enhanced database search interface 600). In various embodiments, the web application may perform one or more queries based on the search expression and/or filtering options to a database that includes the database metadata records 400 to obtain the results that are presented to the user.

One or more database previews may also be provided at 1210. For example, a user may select a table of a database (e.g., from a plurality of search results or through browsing in a menu that shows an inventory of available database backups) and a database preview may be provided to the user responsive to the selection (or responsive to a request to view a database preview for the table). In some embodiments, the user may also select a version of the database, and a database preview corresponding to the version is provided to the user.

At 1212, queries are serviced using the database backups. For example, after a user performs a search and finds the desired database through viewing the database metadata records and/or database previews (or otherwise selects the database from a plurality of database backups), the user may select that database and submit one or more SQL queries. The database backup that was created at 1208 that corresponds to the selected database may be accessed to service the SQL queries. This may include searching one or more Parquet files of the partitioned database backup and returning data from the Parquet files as the results to the SQL queries to the user. In various embodiments, the queries are run using Amazon Athena or similar SQL query service which can run queries against Parquet files. For example, a computing device 102 or the database backup and search system 108 may submit a request to the SQL product (e.g., Amazon Athena) which then accesses the Parquet files. In this manner, a user may search the contents of the database backup very quickly (e.g., within seconds after selecting the database and submitting the query) and without having to do any client and server configuration for the database.

At 1214, database metadata records 400, database preview records 500, and partitioned database backups 900 are updated. For example, when the organization performs a database backup, a database metadata record updating process, database preview updating process, and/or partitioned database backup process may be triggered to update or create a corresponding database metadata record 400, database preview record 500, and/or partitioned database backup 900. In some instances, each time a database is backed up, a new database metadata record 400, preview record 500, and/or partitioned database backup 900 corresponding to the backup version is created. In other embodiments, one or more full copies of any of these may be kept as well as information representing deltas of these with respect to the full copy (such that the database metadata record 400, database preview record 500, or partitioned database backup 900 may for a particular database version may be generated from the full copy and the relevant deltas.

Figure 13:
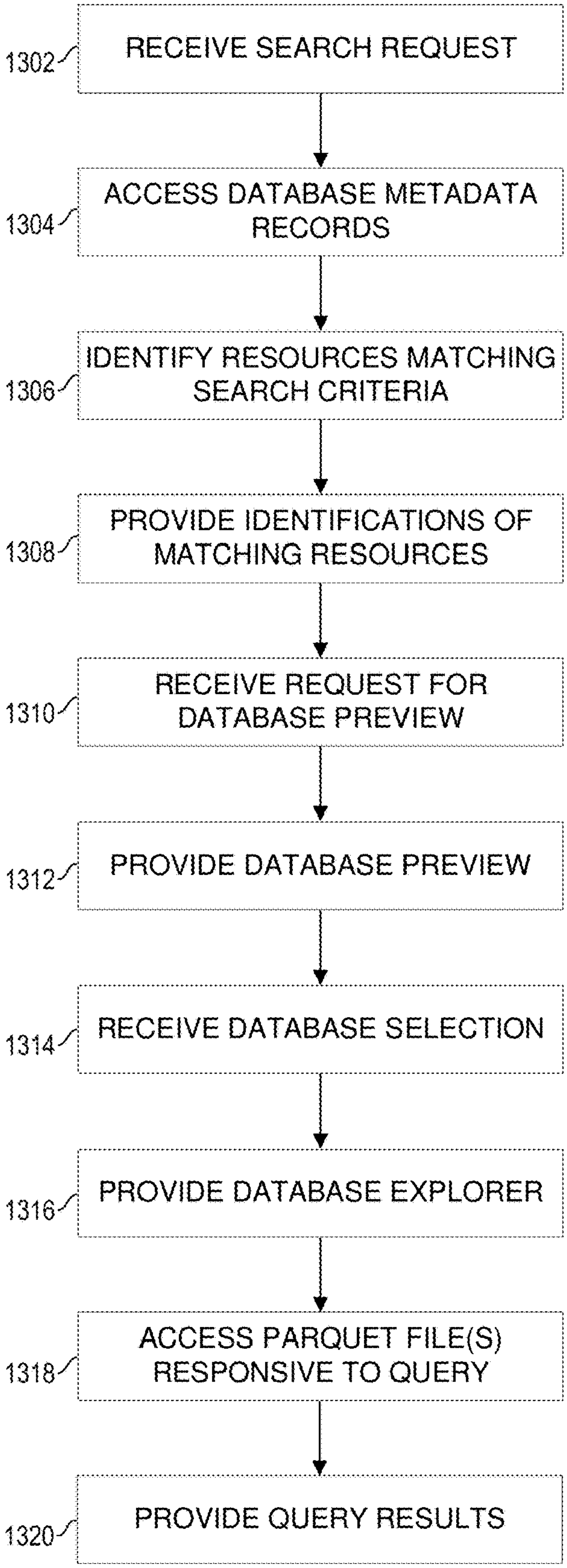
FIG. 13 illustrates an example flow for servicing user queries using partitioned database backups, in accordance with any of the embodiments disclosed herein.

FIG. 13 illustrates an example flow for servicing user queries using partitioned database backups, in accordance with any of the embodiments disclosed herein. The operations of the flow may be performed, e.g., by the database backup and search system 108 alone or in combination with other suitable logic (e.g., enhanced database search interface 600, database preview interface 700, database explorer 800, one or more backends 106, etc.).

At 1302, a search request is received. In some instances, the search request may be received over a network 104 from a computing device 102 of a user of an organization. The search request may include search criteria (e.g., a search expression and/or filtering options). At 1304, database metadata records 400 are accessed. At 1306, database resources matching the search criteria are identified from the database metadata records 400. At 1308, identifications of matching resources are provided. In some instances, the identifications may be provided to the computing device 102 that sent the request. The identifications may include any suitable information about the matching resources, such as table names, column names, Pll information, other metadata described herein, or other suitable information. At 1310, a request for a database preview is received. At 1312, a database preview is provided.

At 1314 a database selection is received. For example, a user may select a database after a search based on a displayed database metadata record 400 and/or database preview record 500. In various instances a page that displays database metadata record 400 or database preview record 500 may include an option to enter a database explorer and the user may thus select the database corresponding to the database metadata record 400 or database preview record 500 by selecting the option to enter the database explorer. In another example, a user may navigate to a database through a user interface that includes a catalog of databases accessible to the user. In other embodiments, the user may select a database via any other method.

At 1316, a database explorer (e.g., an interface including any of the functionality of database explorer 800 or other suitable functionality) is provided to the user. At 1318, Parquet files of a partitioned database backup are accessed responsive to a query from the user (e.g., entered via a user interface of the database explorer). At 1320, results obtained from the Parquet files are returned to the user (e.g., sent to a computing device 102 for display via an interface of the database explorer).

Figure 14:
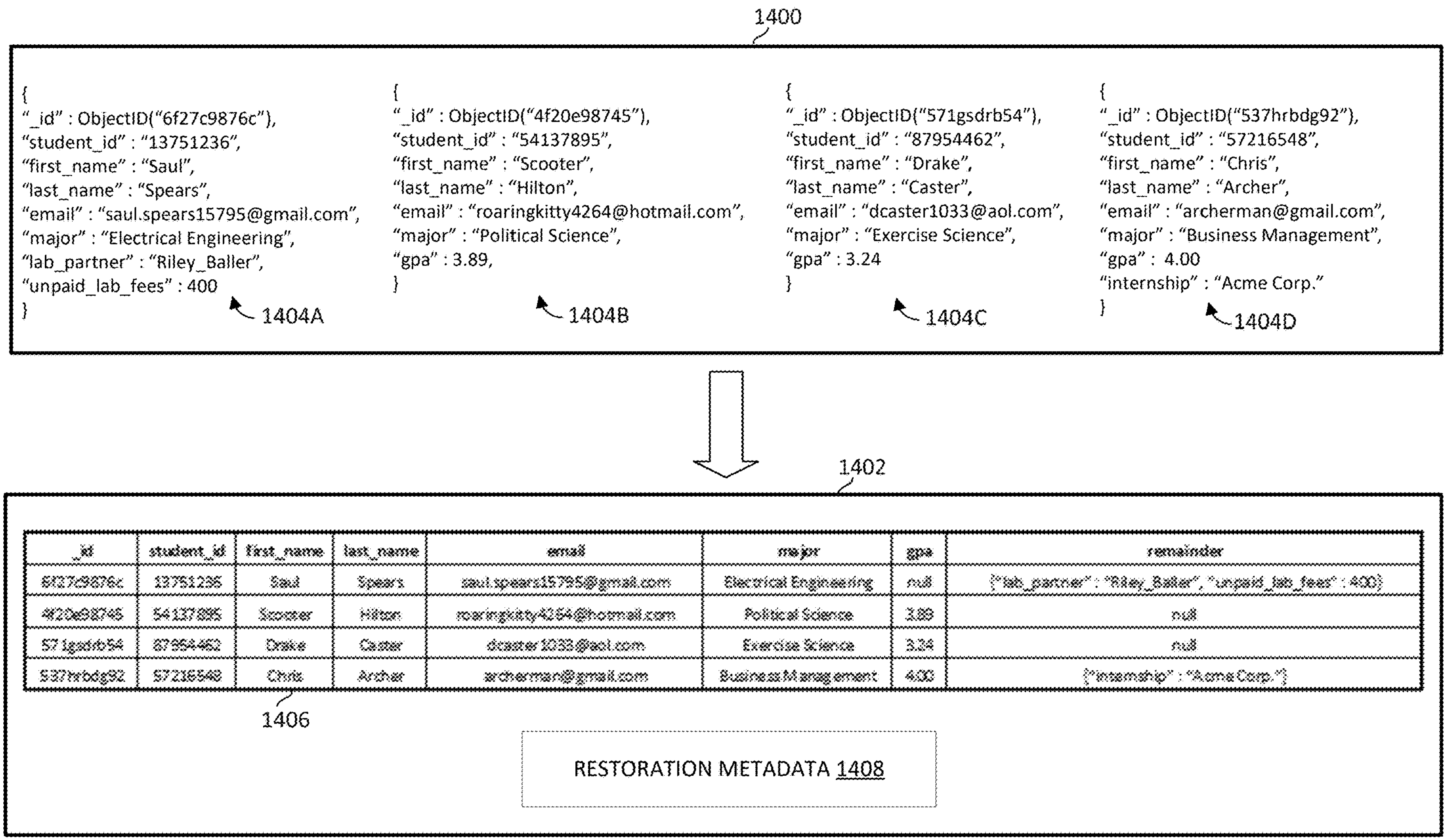
FIG. 14 illustrates an example backup of a document based non-relational database, in accordance with any of the embodiments disclosed herein.

FIG. 14 illustrates an example backup 1402 of a document based non-relational database, in accordance with any of the embodiments disclosed herein.

A non-relational database (also known as a NoSQL database) is a type of database that does not use the traditional table-based structure of a relational database (e.g., SQL database). One group of non-relational databases utilize documents to store data in flexible formats. These document based non-relational databases are designed for handling large amounts of unstructured or semi-structured data using documents, such as JavaScript Object Notation (JSON), binary JSON (BSON), or Extensible Markup Language (XML) documents.

In a document based non-relational database, the database may comprise one or more collections that each comprise one or more documents (generally a collection may include a large number of documents). A collection is a grouping of related documents, similar to a table in a relational database, but without a fixed schema (such that each document within a collection can have a different structure or any number of the documents may share the same structure). A document may be a self-contained data structure that stores information in a flexible, semi-structured format. A document may be hierarchical (e.g., supporting nested objects and arrays), self-describing (e.g., each document may contain all of the necessary information without relying on external schemas), and may facilitate efficient retrieval (e.g., documents can be indexed and queried efficiently).

FIG. 14 illustrates a portion of a collection 1400 of a database. The portion depicted includes four documents 1404A, 1404B, 1404C, and 1404D with documents 1404B and 1404C having the same structure (with the same fields) and documents 1404A and 1404D each having different structures. In the example depicted, documents 1404B and 1404C each include the following keys: _id, student_id, first_name, last_name, email, major, and gpa. Document 1404A also includes the keys_id, student_id, first_name, last_name, email, and major, but omits the gpa key and includes additional keys lab_partner and unpaid_lab_fees. Document 1404D also includes the keys_id, student_id, first_name, last_name, email, major and gpa, and includes additional key internship.

In various embodiments, each document may include a key that includes a value that is a unique identifier of the document (this may be referred to as a document key or primary key). For example, in the embodiment depicted, this key is the _id key. In the embodiment depicted, the documents include other key value pairs, with each key including a corresponding value in the document. In some embodiments, a document may include a key and corresponding nested object(s) (e.g., an address key could include nested keys street, city, and zip with these nested keys each including a respective value. In various embodiments, a document may include a key and a corresponding array of values (e.g., a document may include a classes key and corresponding values English Composition 101, College Algebra, Intro to Business, Principles of Microeconomics, and General Psychology). In some embodiments, a document may include a key that has a value corresponding to another document (e.g., an embedded document). Other suitable key types are contemplated herein.

In various embodiments, the database backup and search system 108 may translate a plurality of documents (e.g., a collection) of a non-relational database into a backup format comprising a table. In some embodiments, the backup format may also comprise restoration metadata. In the embodiment depicted, collection 1400 is translated into a backup 1402 comprising table 1406 and restoration metadata 1408.

When backing up a collection of a document based database, the database backup and search system 108 may determine which keys are to be used as columns in the table of the backup. In some embodiments, any keys that are indexed in the document based database may be automatically selected for columns. Additionally or alternatively, a partial or full scan of the documents of the database may be performed to identify keys that are frequently used and such keys may be selected for columns. Any suitable criteria may be used to determine which keys are selected for columns. For example, a threshold indicating a number of documents or a percentage of documents may be set and any key that appears at a frequency or in a number of documents that exceeds the threshold may be selected as a column. For example, keys that appear in more than twenty percent of the documents of the collection may be selected as a column. As another example, keys that appear in more than fifty percent of the documents of the collection may be selected as a column.

For each key that was selected as a column, a column will be generated in the backup. As an example, in the embodiment depicted, the _id, student_id, first_name, last_name, email, major, and gpa keys are selected as columns, but the lab_partner, unpaid_lab_fees, and internship keys are not selected. Accordingly, table 1406 includes columns for_id, student_id, first_name, last_name, email, major, and gpa.

The backup will also include a column for keys of the documents that are not selected as columns. For each document, any keys that have not been selected may be aggregated with their corresponding values and included in this column.

Each row of the backup corresponds to a document. In table 1406, the first row corresponds to document 1404A, the second row corresponds to document 1404B, the third row corresponds to document 1404C, and the fourth row corresponds to document 1404D. When the document includes a key selected as a column, the corresponding value is placed in the column at the row of the document. When a document does not include a key selected as a column, a null value (or other suitable indication that the value is not present in the document) is placed in the column at the row of the document.

For example, each document 1404A-D include the _id, student_id, first_name, last_name, email, and major keys and thus each row of table 1406 includes values from the respective document for the _id, student_id, first_name, last_name, email, and major columns. The document 1404A does not include the gpa key and thus the first row includes a null value in the gpa column, while the second, third, and fourth rows include the corresponding values for the gpa key from documents 1404B-D within the gpa column.

When a document includes one or more keys not selected as columns in the table 1406, those keys and their corresponding values are aggregated together and placed in an additional column (referred to herein as the "remainder" column). The keys and their values may be aggregated using any suitable format, such as a text format or JSON format. For example, the aggregated value may include a string with a delimiter in between a string representation of each key and corresponding value(s). In the embodiment depicted, the keys lab_partner and unpaid_lab_fees are aggregated together in the row corresponding to document 1404A with a comma delimiter placed between each key value pair and the key internship and its value Acme Corp. is included in the row corresponding to document 1404D. In some instances, one or more value(s) may be converted from their original format into a text format for inclusion in the remainder column. As just one example, if a value is another document, the document may be represented in the remainder column in its entirety (that is, all of the keys and values of the document may be included in the remainder column).

In some embodiments, the backup 1402 may include an additional column (not shown) comprising restoration metadata specifying how to restore data in the row into its original format. For example, the restoration metadata in this column may include instructions as to how to restore the information in the remainder column in the row back to its original key(s) and corresponding value(s). Such information could include information enabling identification of the respective keys and corresponding values within the remainder column and/or information enabling conversion of the representation of one or more values back to its original type (e.g., as a value may be converted from its original type into a string format within the remainder column). In some instances, one or more values of a document (whether for a selected key or for a key that is included in the remainder column) may be in a format that is not compatible with the format the table 1406 is stored in (e.g., Parquet files or other file structure) and thus may be translated into a format compatible with the table. In such instances, instructions specifying how to translate one or more values for the row corresponding to that document may be included in the additional column for that row. In instances in which order of the keys and values in the respective documents is important, the restoration metadata may specify the order of the keys (e.g., the selected keys and/or the keys within the remainder column).

In various embodiments, the information as to how to restore data to its original format may be kept in a column of the table as described above, or in another suitable data structure. For example, such information may be kept in restoration metadata 1408, outside of the table 1406 (e.g., in a different file), especially when the restoration instructions may be applicable to the values of each row in a particular column (and thus may be stored once instead of in every row). As another example, such information may be kept in a portion reserved for metadata in a file used to store at least a portion of the table (e.g., in a Parquet file).

In various embodiments, additional metadata may be kept in restoration metadata 1408 with instructions on how to restore the database. For example, the restoration metadata 1408 may include indications of which keys were indexed in the database (enabling the database backup and search system 108 to rebuild the index structures), functions similar to stored procedures or views (e.g., JavaScript functions, aggregation pipelines, design documents with map-reduce functions, etc.), or other suitable information enabling restoration of the database from the backup 1402.

In various embodiments, the data of the table 1406 of the backup 1402 is split into multiple Parquet files, in a manner similar to that described above with respect to FIGS. 9 and 10 (e.g., operations used to partition a table of a relational database may be applied to partition table 1406). Thus, the format of the data backed up for document based non-relational databases may be similar to the format of the data backed up for relational databases. This allows the backups of the document based non-relational databases to be searched and queried in a manner similar the searching and querying of relational database backups described herein.

Figure 15:
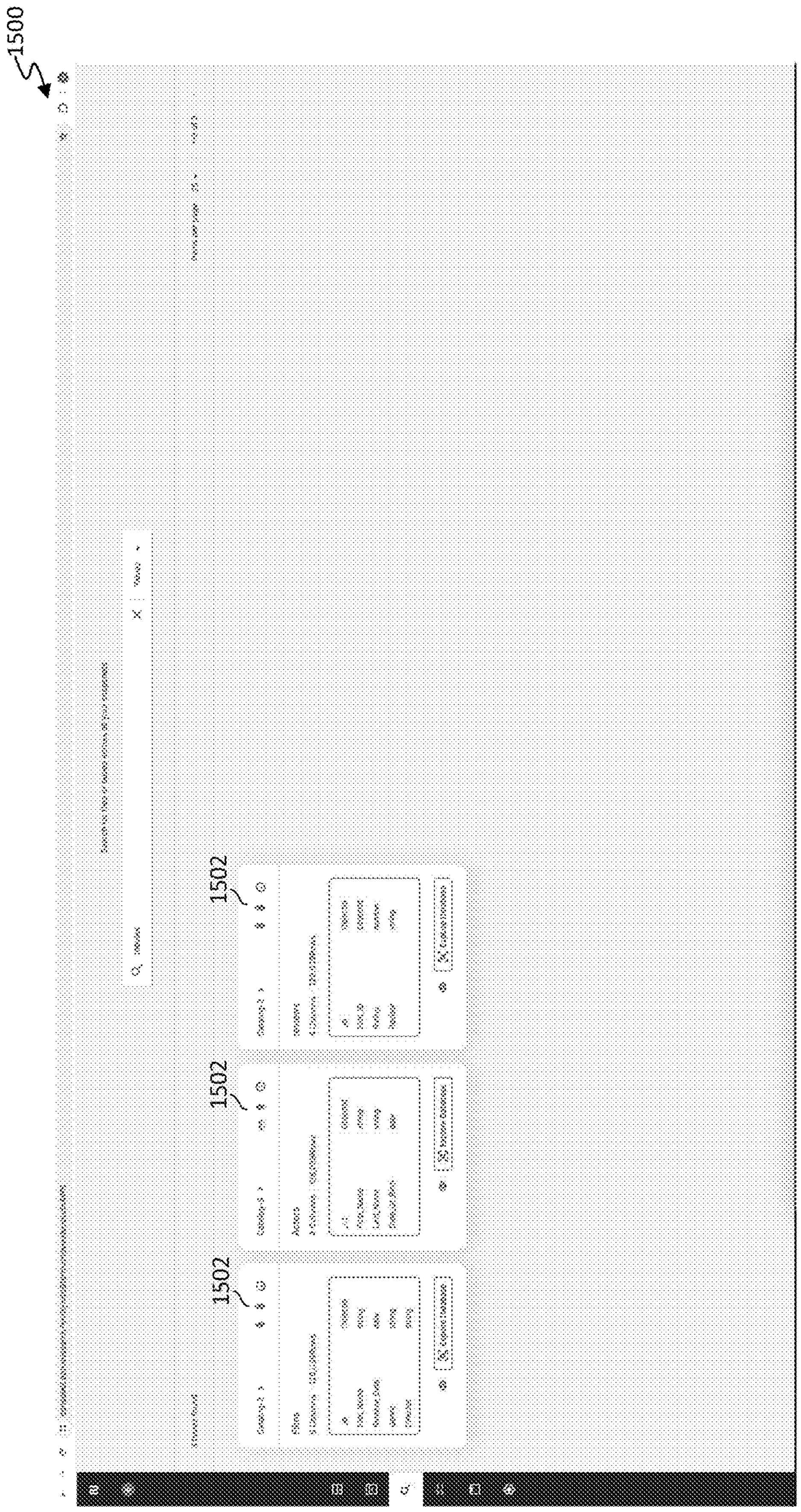
FIG. 15 illustrates an enhanced database search interface for document based non-relational databases, in accordance with any of the embodiments disclosed herein.

FIG. 15 illustrates an enhanced database search interface 1500 for document based non-relational databases, in accordance with any of the embodiments disclosed herein. The enhanced database search interface 1500 may have any suitable characteristics of the enhanced database search interface 600. In the embodiment depicted, a user has entered the search query “movies” and the enhanced database search interface 1500 has returned results matching the query. In this instance, these results include tables “Films”, “Actors”, and “reviews”. Each of these tables are from a backup of a MongoDB database as indicated by the MongoDB logo in the database type 1502. During the backup process, the tables have been generated from corresponding collections of documents of MongoDB databases. The results show a preview of the table, including information such as the number of columns of each table, the titles of the columns, and the type of data in each column (in various embodiments, the number of columns and the column titles may omit the remainder column and/or the additional column with the restoration metadata). The columns displayed here are the columns for the keys selected during translation of the documents to the table as described above.

In some embodiments, the enhanced database search interface 1500 may search for tables in backups of document based non-relational databases only or for tables in backups of document based non-relational databases as well as relational databases. In some instances, the interface may allow the user to select whether the search is limited to document based non-relational databases or relational databases (or whether both should be included in the search) and/or to select specific types of databases to be searched (e.g., MongoDB, MySQL, etc.).

Figure 16:
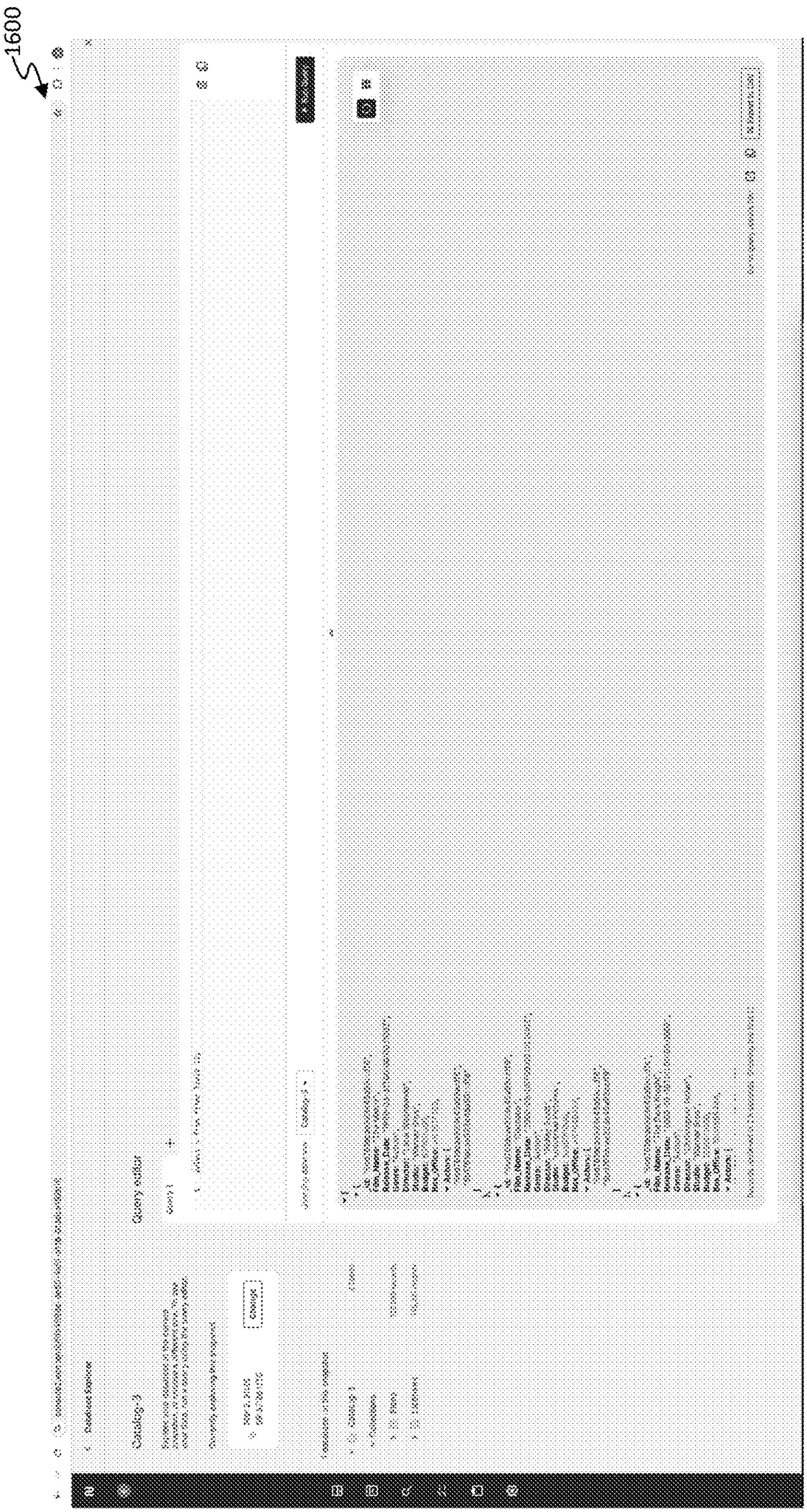
FIG. 16 illustrates a database explorer for submitting queries to backups of document based non-relational databases with results displayed as documents, in accordance with any of the embodiments disclosed herein.

FIG. 16 illustrates a database explorer 1600 for submitting queries to backups of document based non-relational databases with results displayed in document format, in accordance with any of the embodiments disclosed herein. The database explorer 1600 may have any suitable characteristics of database explorer 800, but may alternatively or additionally provide the ability to query database backups of document based non-relational databases (through the tables of the backups). In various embodiments, the database explorer 1600 accepts SQL queries (e.g., from a user) and applies the queries against the table. In addition or as an alternative, the database explorer 1600 may accept queries in the native language of the document based non-relational database (e.g., native MongoDB queries when the database is of the MongoDB type) and apply the queries against the table.

Figure 17:
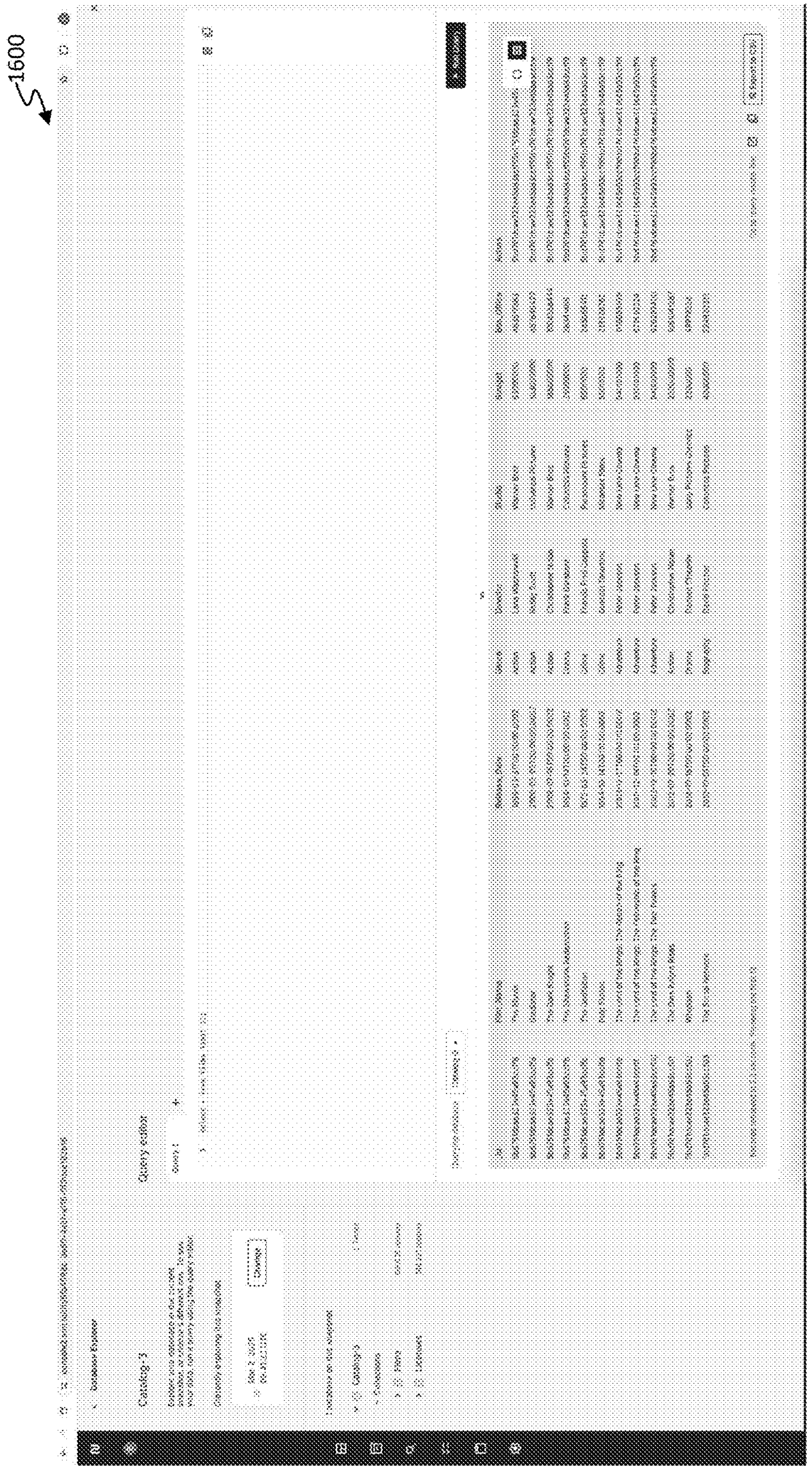
FIG. 17 illustrates a database explorer for submitting queries to backups of document based non-relational databases with results displayed in table format, in accordance with any of the embodiments disclosed herein.

The database explorer 1600 may provide an option allowing a user to view the results from a query in a document format as shown in FIG. 16 or in a table format as shown in FIG. 17. When shown in the document format, the results may be read from the table of the backup and translated back into documents (utilizing the restoration metadata if applicable). When shown in the table format, the results may omit such a translation and the data that is in the table may be provided via the database explorer 1600 (as shown in FIG. 17).

Figure 18:
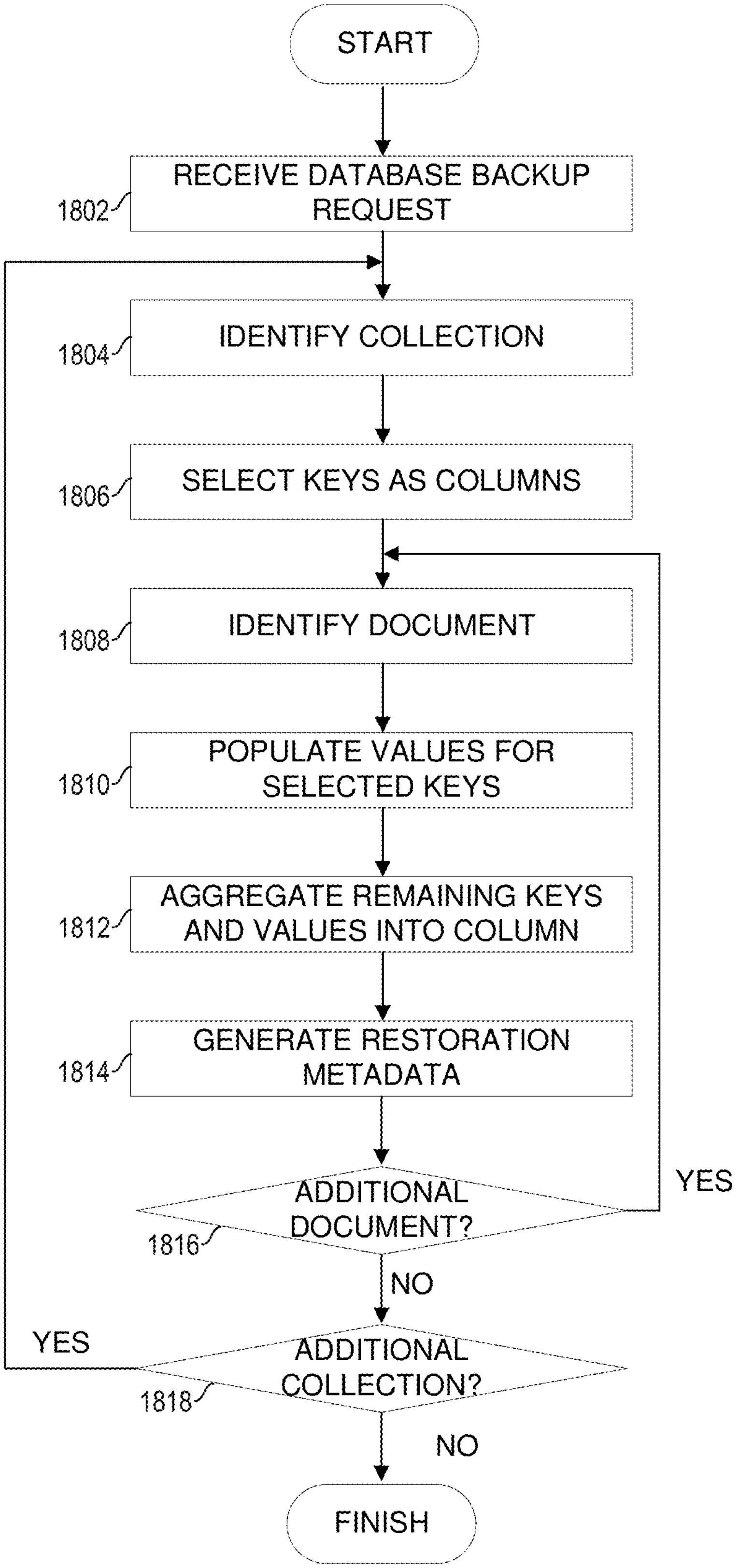
FIG. 18 illustrates a flow for generating a backup of a document based non-relational database, in accordance with any of the embodiments disclosed herein.

FIG. 18 illustrates a flow for generating a backup of a document based non-relational database, in accordance with any of the embodiments disclosed herein. In addition or as an alternative to any of the depicted operations, the flow may include any of the operations of the flow of FIG. 10. Additionally, the flow may include any suitable characteristics of the flow of FIG. 10.

At 1802, a request to backup a document based non-relational database is received. At 1804 a collection of the document based non-relational database is identified. At 1806, keys are selected as columns. In some embodiments, such keys may include keys that are indexed in the document based non-relational database. Additionally or alternatively, keys may be selected based on a frequency of appearance of the keys within the documents. For example, keys appearing more than a threshold number of times may be selected. As another example, the N most frequently appearing keys may be selected (where N may be any suitable integer).

At 1808, a document of the collection is identified. At 1810, values are populated for the selected keys. For example, a row is created for the document and for each of the selected columns, a value of the corresponding key from the document is written to the table (or a null value if the document does not include the key).

At 1812, any remaining keys and their corresponding values are aggregated and placed into a column of the table. At 1814, restoration metadata is generated for the row and stored in a suitable location (e.g., in one or more columns of the table).

At 1816, a determination as to whether there is an additional document in the collection is made. If there is, the flow returns to 1808 to process another document of the collection. If there is not, the flow moves to 1818 where a determination as to whether an additional collection of the database is to be backed up. If there is, the flow returns to 1804 where a table is created for the data of the collection. Once all collections have been backed up, the flow finishes.

In some instances, if a backup has been made previously (e.g., the database backup request is a request for an incremental backup), an analysis may be performed to determine whether any additional keys should be added as columns (e.g., an additional key may have been indexed or a key may now cross the frequency threshold). Responsive to a determination that at least one column is to be added for a key, a full backup is made (whereas incremental backups may be allowed if no additional columns are added).

Figure 19:
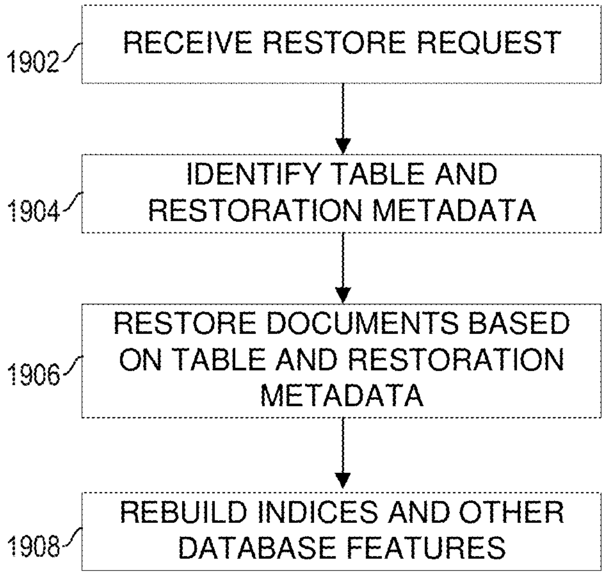
FIG. 19 illustrates a flow for restoring a document based non-relational database, in accordance with any of the embodiments disclosed herein.

FIG. 19 illustrates a flow for restoring a document based non-relational database, in accordance with any of the embodiments disclosed herein. The operations of the flow may be performed, e.g., by database backup and search system 108 or other suitable logic of cloud database backup environment 100. At 1902, a request to restore a database backup is received. For example, the request may be made via a user interface (e.g., of a web application, native application, or other logic) executed by a computing device 102. The request may be sent, e.g., by a computing device 102 to a database backup and search system 108, backend 106, and/or other logic.

At 1904, a table and restoration metadata is identified. At 1906, documents are restored based on the table and restoration metadata. For example, a row of the table is read, and a document is constructed based on the contents of the row and the restoration metadata. In some instances, one or more values of the row may be converted based on the restoration metadata back into their original format. The document may be place in a collection. The next row of the table is then read and another document is constructed and added to the collection. Additional documents are constructed in like manner. At 1908, indices and other database features (e.g., data structures similar to stored procedures and views, etc.) may then be reconstructed based on the restoration metadata.

Any of the functionality described above with respect to relational database backups may be applied to backups of document based non-relational databases as well. For example, database metadata records and/or database preview records may be created for such backups, the backups may be organized as partitioned database backups, etc.

It is important to note that the operations in FIGS. 9-14 and 18-19 illustrate only some of the possible scenarios that may be executed by, or within, the various components of the systems described herein. Some of these operations may be removed or repeated where appropriate, or these steps may be modified or changed considerably without departing from the scope of the present disclosure. In addition, the timing of these operations may be altered considerably. For example, operations may occur in different orders or multiple operations may be performed in parallel. The preceding operational flows have been offered for purposes of example and discussion. In various embodiments, any suitable characteristics described with respect to an operation of one of these flows may be applied to a similar operation of another of these flows.

Logic can be used to implement the functionality of various components or to carry out the operations of the flows described herein. "Logic" may refer to hardware, firmware, software, or any combination of these to perform one or more functions. In some embodiments, logic may include a microprocessor or other processing elements capable of executing software instructions, discrete logic such as an application-specific integrated circuit (ASIC), a programmable logic device like a field-programmable gate array (FPGA), a storage device with recorded instructions, combinations of logic devices (e.g., on a printed circuit board), or other suitable hardware and software configurations. Logic may also include gates or other circuit components. In certain cases, logic may be entirely implemented as software. This software can take the form of packages, code, instruction sets, or data stored on a non-transitory computer-readable storage medium.

The embodiments of methods, hardware, software, firmware, or code described above may be implemented through instructions or code stored on a machine-accessible, machine-readable, computer-accessible, or computer-readable medium that can be executed by a processing element. A non-transitory machine-readable medium may refer to a mechanism that provides (e.g., stores and/or transmits) information in a format readable by a machine, such as a computer or electronic system. Examples of such non-transitory media include random-access memory (RAM), such as static RAM (SRAM) or dynamic RAM (DRAM); read-only memory (ROM); magnetic or optical storage media; flash storage devices; electrical and optical storage devices; acoustical storage devices; and other forms of storage devices that retain information obtained from transitory (propagated) signals (e.g., carrier waves, infrared signals, digital signals). These non-transitory media are distinct from the transitory signals themselves, which may provide information to the storage media.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. For example, the phrase "A and/or B" means (A), (B), or (A and B), while the phrase "A, B, and/or C" means (A), (B), (C), (A and B), (A and C), (B and C), or (A, B, and C).

As used throughout this description, and in the claims, a list of items joined by the term "at least one of" or "one or more of" can mean any combination of the listed terms.

What is claimed is:

1. A method, comprising:

analyzing a non-relational database comprising a plurality of documents to select one or more keys as columns; and generating a backup of the non-relational database, the backup comprising a table with a plurality of rows and columns, wherein a row of the table corresponds to a document of the plurality of documents, wherein, for each key that was selected as a column, a column is generated in the backup, wherein the table comprises a remainder column for keys of the documents that are not selected as columns, wherein, when a document includes one or more keys not selected as columns, the one or more keys and corresponding values are aggregated together and included in the remainder column, and wherein the backup comprises restoration metadata specifying how to restore data in a row of the table into its original format.

2. The method of claim 1, the backup further comprising metadata facilitating restoration of the non-relational database from the table.

3. The method of claim 2, wherein the metadata comprises an indication of keys of the non-relational database that are indexed.

4. The method of claim 2, wherein the metadata comprises an indication of a format translation methodology for a value of the table to a corresponding value of a document of the non-relational database.

5. The method of claim 2, wherein a column of the table comprises the metadata.

6. The method of claim 1, wherein the table comprises a plurality of columns for values of a subset of keys of the plurality of documents.

7. The method of claim 6, wherein the table comprises a column for values of keys of the plurality of documents that are not part of the subset of the keys.

8. The method of claim 7, wherein a first row of the plurality of rows corresponds to a first document of the plurality of documents, and wherein a plurality of keys and values of the first document are aggregated together and stored in the column.

9. The method of claim 1, wherein the one or more keys are selected based on a frequency of appearance of the one or more keys within the plurality of documents.

10. The method of claim 1, further comprising partitioning the plurality of rows of the table among a plurality of files having a columnar storage file format.

11. The method of claim 10, further comprising searching the table of the backup of the non-relational database using a Structured Query Language (SQL) query.

12. The method of claim 1, further comprising restoring the documents based at least in part on the table and the restoration metadata.

13. The method of claim 1, further comprising receiving a query from a user, searching a plurality of tables of backups of document based non-relational databases, determining that the table matches the query, and providing information about the table for display.

14. The method of claim 1, further comprising receiving a query from a user, performing a search of the table of the backup based on the query, and providing information from the search for display.

15. An apparatus comprising:

a communication interface to receive a request to back up a non-relational database comprising a plurality of documents; and at least one processor configured to analyze the non-relational database to select one or more keys as columns and to generate a backup of the non-relational database, the backup comprising a table with a plurality of rows and columns, wherein a row of the table corresponds to a document of the plurality of documents, wherein, for each key that was selected as a column, a column is generated in the backup, wherein the table comprises a remainder column for keys of the documents that are not selected as columns, wherein, when a document includes one or more keys not selected as columns, the one or more keys and corresponding values are aggregated together and included in the remainder column, and wherein the backup comprises restoration metadata specifying how to restore data in a row of the table into its original format.

16. The apparatus of claim 15, wherein the table comprises a plurality of columns for values of a subset of keys of the plurality of documents.

17. The apparatus of claim 16, wherein the table comprises a first column for values of keys of the plurality of documents that are not part of the subset of the keys.

18. The apparatus of claim 17, wherein the table comprises a second column for metadata describing how to restore values of the first column.

19. At least one computer-readable non-transitory media comprising one or more instructions that when executed by at least one processor configure the at least one processor to cause performance of operations comprising:

analyzing a non-relational database comprising a plurality of documents to select one or more keys as columns; and generating a backup of the non-relational database, the backup comprising a table with a plurality of rows and columns, wherein a row of the table corresponds to a document of the plurality of documents, wherein, for each key that was selected as a column, a column is generated in the backup, wherein the table comprises a remainder column for keys of the documents that are not selected as columns, wherein, when a document includes one or more keys not selected as columns, the one or more keys and corresponding values are aggregated together and included in the remainder column, and wherein the backup comprises restoration metadata specifying how to restore data in a row of the table into its original format.

20. The at least one media of claim 19, wherein the table comprises a plurality of columns for values of a subset of keys of the plurality of documents.

* * * * *